US005891747A

United States Patent [19]
Farah

[11] Patent Number: 5,891,747
[45] Date of Patent: Apr. 6, 1999

[54] INTERFEROMETRIC FIBER OPTIC DISPLACEMENT SENSOR

[76] Inventor: John Farah, M.I.T. P.O. Box 397301, Cambridge, Mass. 02139

[21] Appl. No.: 456,189

[22] Filed: May 30, 1995

Related U.S. Application Data

[63] Continuation of Ser. No. 990,622, Dec. 14, 1992, Pat. No. 5,420,688.
[51] Int. Cl.⁶ .................................................. G01B 11/16
[52] U.S. Cl. ............................... 438/31; 438/32; 438/52; 356/358
[58] Field of Search .................................... 437/225, 228, 437/228 O, 228 H, 228 SW, 901, 921, 927; 156/656.1, 657.1, 662.1; 73/653, 655, 657; 438/31, 32, 52; 356/358

[56] References Cited

U.S. PATENT DOCUMENTS

| | | | |
|---|---|---|---|
| 4,293,188 | 10/1981 | McMahon | 350/96.29 |
| 4,300,813 | 11/1981 | Gravel | 350/96.1 |
| 4,421,384 | 12/1983 | McMahon | 350/96.29 |
| 4,739,661 | 4/1988 | Bucholtz et al. | 73/517 R |
| 4,876,447 | 10/1989 | Killian | 250/227 |
| 5,024,500 | 6/1991 | Stanley | 350/96.15 |
| 5,094,936 | 3/1992 | Misium et al. | 430/325 |
| 5,231,286 | 7/1993 | Kajimura et al. | 250/234 |
| 5,437,186 | 8/1995 | Tscholena | 73/514.26 |

OTHER PUBLICATIONS

Kevin E. Burcham, Gregory N. de Brabander and Joseph T. Boyd "Micromachined Silicon Cantilever Beam Accelerometer Incorporating an Integrated Optical Waveguide". Sep. 1992, 7 pages.

P.J. Mulhern, T. Hubbard, C.S. Arnold, B.L. Blackford, and M.H. Jeri "A scanning force microscope with a fiber–optic interferometer displacement sensor". May 1991. p. 1281.

*Primary Examiner*—Charles L. Bowers
*Assistant Examiner*—Matthew Whipple

[57] ABSTRACT

A method is presented to produce a change in the optical path length in the gap between two single mode optical fibers proportional to the lateral displacement of either fiber end normal to its axis. This is done with the use of refraction or diffraction at the interface between a guiding and non-guiding media to change the direction of propagation of the light in the gap. A method is also presented for laying a waveguide on a cantilever so that the displacement of the tip of the cantilever produces a proportional path length change in the gap by distancing the waveguide from the neutral axis of the cantilever. The fiber is supported as a cantilever or a waveguide is deposited on a micromachined cantilever and incorporated in an interferometer which is made totally on a silicon substrate with the use of integrated-optic technology. A resonant element in the form of a micro-bridge is incorporated in the ridge waveguide and produces a frequency output which is readily digitizeable and immune to laser frequency noise. Finally, monolithic mechanical means for phase modulation are provided on the same sensor substrate. This is done by vibrating the cantilever or micro-bridge either electrically or optically.

25 Claims, 17 Drawing Sheets

A
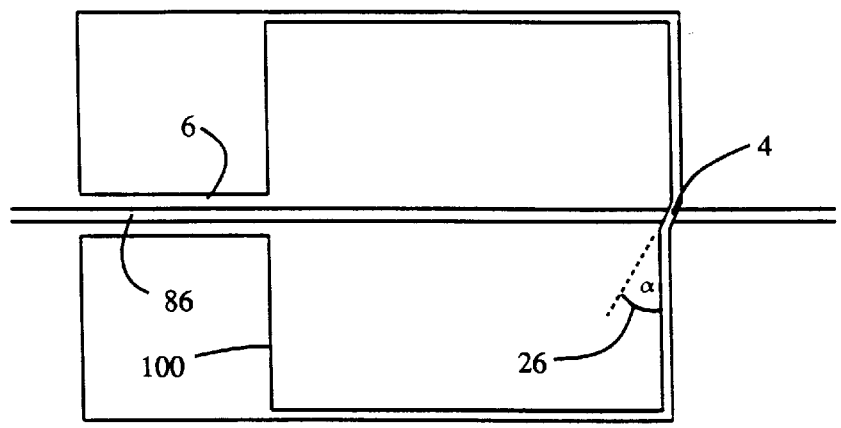
B
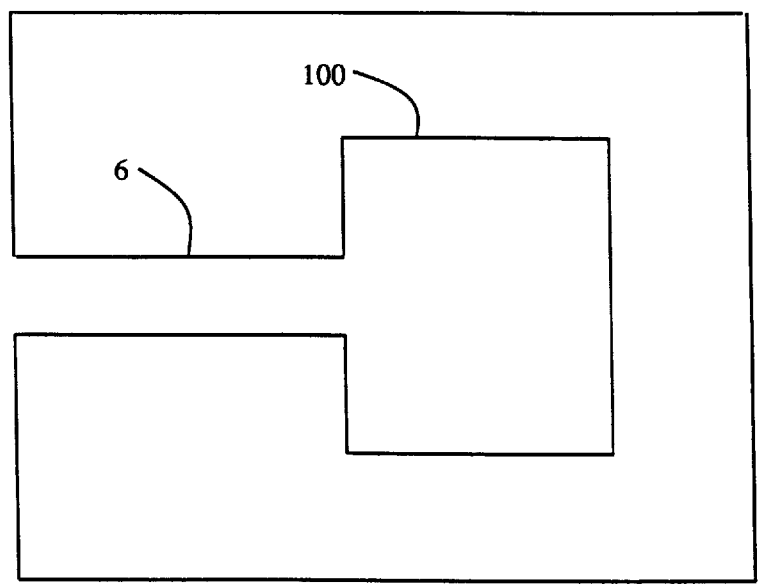
FIG. 12

INTERFEROMETRIC FIBER OPTIC DISPLACEMENT SENSOR

This application is a Continuation of application Ser. No. 07/990,622 filed Dec. 14, 1992 which matured into U.S. Pat. No. 5,420,688.

This invention was made with Government support under Grant No. DE-FG02-90ER81033 awarded by the Department of Energy. The Government has certain rights in this invention.

A portion of the disclosure of this patent document contains material which is subject to copyright protection. The owner has no objection to facsimile reproduction by anyone of the patent document or disclosure as it appears in the Patent and Trademark Office patent file or records for non-manufacturing uses, but otherwise reserves all copyright rights whatsoever.

FIELD OF THE INVENTION

This invention relates to fiber-optic and integrated-optic transducers, specifically those which are extrinsic in nature and of the interferometric type.

BACKGROUND OF THE INVENTION

Optical sensors have clear advantages namely sensitivity; accuracy; wide dynamic range; and the inherent immunity to thermal and electromagnetic disturbances. Fiber-optic sensors offer the advantage of compactness.

Fiber-optic sensors may be classified in two major categories: intrinsic, where the measured parameter interacts with the guided light inside the fiber; and extrinsic where the measured parameter interacts with the light outside the fiber. In extrinsic sensors the fiber or waveguide is used only to guide light to the location of the interaction.

In intrinsic sensors long loops of fiber (up to a few hundred meters for hydrophones) are needed to accumulate appreciable signal because sensitivity of optical characteristics of the fiber to a measured parameter is small. However, such long fiber cables become more sensitive to parameters other than the one being sensed. Fiber optic hydrophones which are used for sensing sound transmitted through water, for example, are more susceptible to random fluctuations in temperature along the fiber than to pressure variations. Further, the optical fiber supports two orthogonal modes of polarization. This creates mode hopping, i.e. the state of polarization of the output fluctuates in a long fiber and introduces extraneous noise. Also performance of intrinsic sensors is critically dependent on opto-mechanical properties of the fiber which may vary from batch to batch or over time, thus requiring frequent calibration.

Extrinsic sensors, on the other hand, do not rely on the length or properties of the fiber to amplify the signal and are therefore more compact, reliable, and less susceptible to outside disturbance. Further, volume between fibers in an extrinsic sensor can be reduced tremendously to produce true point sensors, desirable in situations where the field to be measured varies appreciably along the length of a transducer.

Fiber optic sensors can be further classified as interference or intensity types depending on the property of light modulated by interaction with the measured parameter. Interference is a phenomenon where the superposition of two or more waves creates a change or redistribution in the intensity of the light which is related to the relative phase difference between the waves. The phase change is caused by the parameter which we desire to measure. Thus the parameter can be inferred from the phase measurement. Phase modulation by interference is more accurate and sensitive than intensity modulation because the path length change is referenced to the wavelength of light. Interference sensors have better performance and wider dynamic range than intensity sensors because of the elaborate feedback schemes commonly used in conjunction with phase modulation.

Interferometric sensors employ single mode fibers or waveguides where the core diameter is of the order of a few wavelengths (5–10 microns), while intensity type sensors use multimode fibers whose core is up to 100 microns in diameter. In extrinsic sensors light must reenter a fiber after interaction with the parameter to be measured. This is very difficult to do with a single mode fiber because of tight alignment tolerances that must be observed. This explains in part why most optical fiber sensor development in the last one and a half decades since its inception have been either intrinsic interferometric or extrinsic intensity type sensors. Two authors who have written extensive surveys on fiber optics sensors: D. H. McMahon in "Fiber-Optic Transducers," *IEEE Spectrum*, December 1981, pages 24 and 26; and W. B. Spillman in "Multimode fiber-optic hydrophone based on a schlieren technique," *Applied Optics*, February 1981, page 465, assert that single mode (interference) sensors are mostly intrinsic whereas multimode (intensity) type sensors are usually extrinsic. No mention is made of extrinsic interferometric sensors. U.S. Pat. No. 4,421,384 discloses an extrinsic fiber-optic acoustic sensor where coupling mechanism across air gap between two multimode fibers depends on frustrated total internal reflection which is an intensity rather than interference effect. Also U.S. Pat. No. 4,293,188 discloses an extrinsic fiber-optic displacement sensor with a gap between two multimode fibers effecting intensity modulation. It uses cylindrical GRIN lenses at fiber ends centered on fiber axis. A variation uses diffraction gratings on facets of fiber ends to shadow parts of light beam and produce intensity modulation. Lack of progress based on extrinsic interferometric principles is in part due to lack of transduction techniques to convert small displacements into proportional phase changes.

In an extrinsic sensor light is ejected from the end of a fiber or waveguide and reflected off an external mirror either into the same or another fiber. Between the two fiber ends light is unguided, and it may or may not be collimated. A displacement sensor measures motion of external mirror relative to the rest of the interferometer as affected by environmental excitations such as acceleration, displacement or acoustic signal. Motion of the mirror alters the path length of the light and produces phase modulation in the interferometer. If the sensor measures displacement or proximity of a nearby object then the mirror is detached from the rest of the interferometer and affixed to the moving body. For example the Atomic Force Microscope (AFM) has a tiny mirror attached to the tip of a miniature cantilever beam which is made to track the surface topography of a sample down to subatomic resolution. If a sensor measures acceleration or vibration, the mirror is mounted on a flexible element such as a thin diaphragm or a cantilever beam and the whole interferometer is attached to the vibrating body. Mirror displacement can also result from subjecting the interferometer to an acoustic signal as in hydrophones. D. A. Jackson, et al. describes a "high sensitivity fiber-optic accelerometer" having a spherical mirror mounted on a thin flexible diaphragm in *Optics Letters*, Feb. 15, 1989, page 251.

Extrinsic interferometric displacement sensors currently available require an external mirror which is mounted on a cantilever beam or a diaphragm. This adds bulk and expense to system because the cantilever must be fabricated separately, mirrored and then attached to the interferometer. Miniaturization is desired in order to take full advantage of batch fabrication techniques which are well established in microelectronic and integrated-optic industries, where a whole sensor or interferometer is fabricated in a few steps on a semiconductor substrate. Thus, configurations currently used requiring addition of an external cantilever beam do not lend themselves to miniaturization.

In the scanning AFM a sharp stylus on the tip of a microfabricated cantilever is made to track surface topography of a sample as the sample is scanned in its own plane. Interferometry has been used for the measurement of cantilever deflection. A single mode optical fiber is brought within a few microns of the cantilever tip as described by D. Rugar et al in "Improved fiber-optic interferometer for atomic force microscopy," *Applied Physics Letters*, Dec. 18, 1989, page 2588. This is necessary to reduce acoustic noise generated in the air gap and the effect of light source frequency fluctuations since a resolution of 0.1 Angstrom is required. This configuration which utilizes an external mirror in the design of the AFM presents a few problems. Precise positioning of the fiber over the cantilever is a major alignment problem in any extrinsic interferometer. Another problem which arises in conjunction with the AFM is scanning large samples. Since the scanning range of a sample is limited it is often desirable to scan the cantilever along with its optical interrogation system, that is the interferometer instead of the sample. This is a particular problem with bulky optical systems which utilize heavy focusing lenses and laser sources, but also with fiber-optic systems in which the fiber is directed normal to the plane of the cantilever.

One solution to these problems is to lay the fiber or waveguide on top of the cantilever. Fiber cantilevers have been proposed for the extrinsic measurement of displacement. Sometimes the fiber was strapped onto a thin cantilever or a thin film waveguide was deposited on a microfabricated cantilever. However, all these sensors have been of the intensity modulation type because the fiber or waveguide is aligned with the neutral axis of the cantilever. This is certainly true when the fiber itself is used as the cantilever. In the other instances a microfabricated cantilever is thin enough so that the fiber is substantially aligned with the neutral axis. It is known that a neutral axis moves only transversely to itself under cantilever flexure. It has remained a problem, however, to transduce a path length or phase change proportional to this lateral displacement. This explains why most extrinsic sensors have been of the intensity type. Proportionality is important to simplify signal processing and to obtain a sizable signal in the case of small displacements.

SUMMARY OF THE INVENTION

A novel extrinsic interferometric displacement sensor is disclosed which utilizes a gap in the light path between a cantilevered fiber and a fixed fiber. Flexure of the fiber cantilever alters the optical path length proportionally and produces phase modulation in the interferometer. This is obtained by changing the direction of light in the gap so that lateral displacement of the end of cantilevered fiber has a component along the direction of propagation of light in the gap. This is achieved by refraction or diffraction at the interface between the cantilevered fiber end and the air gap. This provides an all-fiber configuration whereby the fiber itself becomes the cantilever and the light couples directly between the fiber ends thereby eliminating an intermediary external mirror. This configuration lends itself readily to miniaturization and is completely compatible with integrated-optic technology.

The planar approach, in which thin film waveguides are deposited over semiconductor substrates, is especially beneficial to extrinsic interferometric sensors because it allows precise control over dimensional tolerances of the gap between waveguides by virtue of submicroscopic accuracy of batch fabrication techniques standard in the microelectronics industry. This alleviates alignment and reinsertion problems between single mode waveguides and eliminates the need for tedious manual procedures encountered in the alignment of two single mode fibers.

The use of planar technology also allows greater flexibility in placing a waveguide over a cantilever so that it can be moved substantially away from the neutral axis, as may be necessary to create path length variations proportional to lateral displacement of the cantilever.

The combination of integrated optics and semiconductor micromachining can make possible the realization of new principles in fiber optic sensors.

It is an object of this invention to produce a change in the optical path length proportional to the lateral displacement of the tip of the cantilever.

BRIEF DESCRIPTION OF THE DRAWINGS

FIGS. 12A and B is a schematic diagram showing photomasks upper A and lower B used for fabrication of a silicon cantilever and proof mass.

DESCRIPTION OF THE PREFERRED EMBODIMENTS

Figure 1:
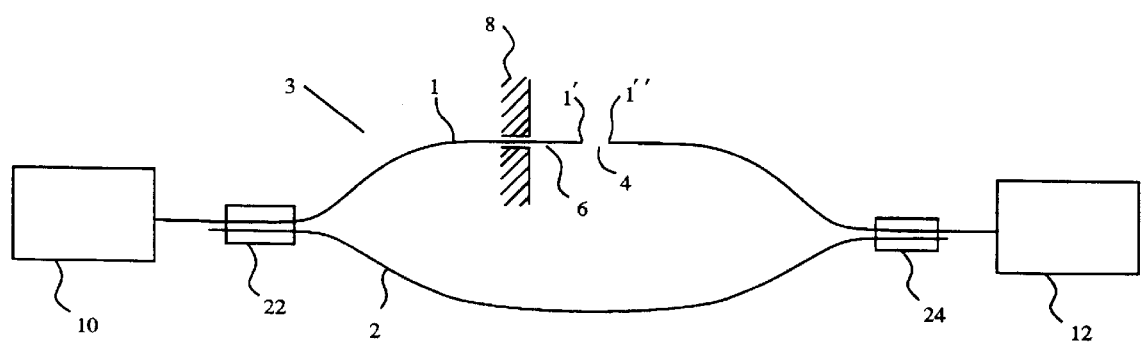
FIG. 1 is a schematic diagram of an embodiment using a Mach-Zehnder fiber-optic displacement sensor.

If two single mode fibers or waveguides are placed coaxially in close proximity having their ends cleaved or polished normal to their common axis such that the distance d between them is about ten microns or less, then light can couple from one fiber end to the other across the gap. An optical fiber is cantilevered by clamping it tightly a short distance away from its end. One or both fibers can be cantilevered. The optical path length in the gap, i.e. the distance between the two fiber ends, is designated by P. In the absence of any displacement P=d. However, if the cantilever is excited by an acceleration or an acoustic signal then its tip moves laterally, i.e. perpendicular to the fiber axis by a distance y. The optical path length in the gap is then described by the equation $P=\sqrt{y^2+d^2}$. Displacement y depends on the magnitude of excitation and on mechanical characteristics of the fiber cantilever. However, typically y is less than d and the relationship between P and y is non-linear. For small displacements encountered in the measurement of very faint signals, in environments where these transducers may be required to operate, P can be approximated by the equation, $$P \approx d\left(1 + \frac{1}{2}\frac{y^2}{d^2}\right) \qquad (1)$$

Thus, small displacements produce only a second-order change in optical path length which is negligible. This explains why extrinsic cantilevered fiber sensors have been of the intensity rather than interference type.

The goal of this invention is to effect linearity between P and y. Linearity is desirable and necessary to obtain a direct reading of the parameter being sensed such as acceleration, since it is assumed that the mechanical response of a cantilever is linear. One of the reasons why interferometers operate in phase locked loops is that linearity in the transduction mechanism enhances the signal to noise ratio and simplifies further signal processing.

As indicated, the reasons why the phase transduction mechanism has not been used are that the fiber or waveguide is substantially coincident with the neutral axis of the cantilever which has only lateral displacement; and that the end facet of a moving waveguide is normal to the axis so that light travels in the gap along the axis of the opposing waveguides. Since motion of the cantilever tip is transverse to this axis, it has no component along the direction of propagation of the light in the gap, hence it produces no path length or phase change.

This situation can be remedied in two ways. First, when a fiber or waveguide is kept substantially coincident with the neutral axis, then light in the gap can be directed at an angle relative to the common axis of the waveguides using refraction or diffraction at the interface between the moving waveguide and the medium of the gap, so that the displacement of the tip of the waveguide has a component along the direction of propagation of the light in the gap. Second, since points off the neutral axis have a displacement which is not completely transverse but has a component along the axis of the waveguide, a path length or phase change can be transduced simply by placing the waveguide off the neutral axis or by terminating the waveguide at a point on the cantilever whose displacement is not transverse but has a component along the axis of the waveguide at that point.

In this disclosure the words waveguide and fiber or optical fiber are used interchangeably. Since in an extrinsic sensor optical properties of the fiber are not critical, any reference to waveguide should be understood to include any conduit of electromagnetic radiation or any optical path capable of producing a path length change proportional to lateral displacement, whether the light is guided or not. A waveguide is sometimes called guiding medium and the gap between waveguides referred to as non-guiding medium. Edges or ends of waveguides bordering the gap are the interfaces between guiding and non-guiding media. Throughout this specification any reference to light should be taken to include electromagnetic radiation (radiant energy) including infrared, visible and ultraviolet. The radiant energy can be at any wavelength guided by the waveguides.

The most commonly used fiber-optic interferometer is the Mach-Zehnder type. An embodiment which consists of a fiber-optic Mach-Zehnder interferometer is shown schematically in FIG. 1. The interferometer 3 has a light source 10, a pair of single-mode optical fibers 1, 2 forming two arms and an optical detector 12. Light entering one end of the fiber splits at splitter 22 into arms 1 and 2 and recombines at combiner 24 to create an interference. One or both arms of the interferometer are cut and the fiber ends 1' and 1" separated axially to create a non-guiding medium through which the light crosses the gap 4 from one fiber end to the other. If one fiber is fixed by a clamp 8 a distance away from its end to form a cantilever 6, as shown in FIG. 1, then it is desired to produce a path length change in the gap 4 or equivalent phase change in the interferometer 3 proportional to the lateral displacement of the fiber end 1' perpendicular to the axis of the fiber. The interferometer 3 can be used as an accelerometer or an acoustic sensor by subjecting the cantilever to an acceleration or acoustic signal. Displacement of the cantilever fiber end 1' is assumed to be proportional to the acceleration or acoustic signal. The interferometer 3 can also be used to measure surface topography in an atomic force microscope by making fiber tip 1' track the surface of a sample. The Mach-Zehnder fiber-optic configuration shown in FIG. 1 is very advantageous because it is compact and highly sensitive.

Figure 2A:
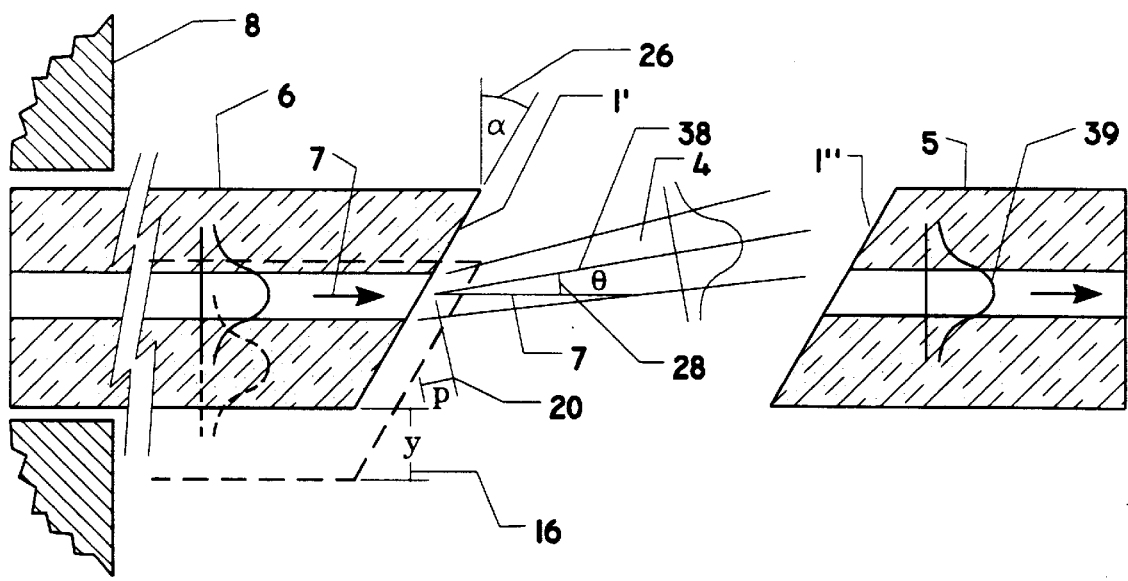
FIGS. 2A and B is a schematic diagram of a gap between fiber ends showing optical path length change due to cantilever tip motion.

In the gap 4 between the two fiber ends 1' and 1" light travels freely unguided in a Gaussian mode 37. The intensity profile 39 of a single mode optical fiber also approaches that of a Gaussian. The amount of light coupled from one fiber to the other depends on the overlap integral over plane of facet of fiber end 1" of the product of the two Gaussian profiles. The coupling efficiency is the overlap integral of the normalized Gaussian profiles. It has a maximum of unity when the two Gaussians are identical and superimposed. The coupling efficiency is less than unity because light diverges in the gap. Further, when the cantilever flexes, the two Gaussian profiles are displaced laterally from each other, reducing the coupling efficiency further. However, in an interferometer the change in coupling efficiency should be inconsequential because output is driven by changes in phase. If the end face of the fiber 1' is cleaved normal to its axis then the path length change in the non-guiding medium is a second-order function of the displacement of the cantilever according to equation 1. A linear relationship is preferred. This is obtained by directing the light 38 through the gap 4 at a substantial angle θ 28 (about 20°) relative to the fiber axis 7 using refraction at the interface between fiber end 1' and the gap 4 which has a index of refraction different from that of the fiber. The fiber end 1' has a facet inclined at angle α 26 with respect to the axis 7, as shown in FIG. 2. Light is then refracted in the gap at angle θ 28. According to Snell's Law $n_1 \sin(\theta+\alpha) = n \sin \alpha$, where n is the index of refraction of the fiber and $n_1$ is the index of refraction of the non-guiding medium. This angle is crucial to the success of phase transduction because the path-length change P 20 is the projection of the cantilever tip displacement y 16 on the direction of propagation of the light 38 in the air gap. Accordingly, $$P = y \sin \theta \qquad (2)$$

and the phase change φ is $$\phi = \frac{2\pi}{\lambda} P \qquad (3)$$

where λ is the wavelength of the light in the non-guiding medium. The larger the face inclination angle α and therefore the angle θ, the higher the sensitivity. α values between 20° and 40° depending on the core material used usually yield adequate phase sensitivity. The inclination angle α also helps eliminate spurious Fabry-Perot modes which would occur when light reflects back and forth in the gap 4 between parallel facets of fiber ends 1' and 1" if the facets are oriented perpendicular to the direction 38 of light in the gap. The facets of fiber ends 1' and 1" need not be perfectly flat although making them substantially planar helps to preserve directionality of light in the gap and reduces wavefront distortion. Since single mode fibers or waveguides are used and light travels at an oblique angle in the gap, then the distance between the fiber ends must be kept very small, about 10 microns or less, in order to maintain an acceptable coupling efficiency.

Figure 2B:
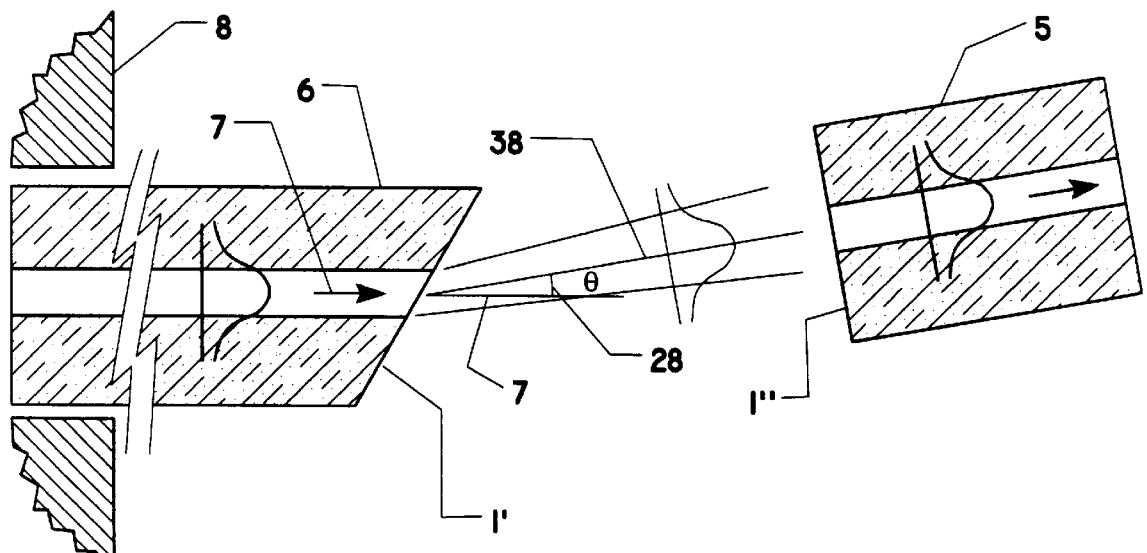

Actually, when the cantilever flexes, the angle θ 28 changes slightly but the cantilever can be designed to flex by an angle which is very small compared to the original angle θ so that the change is insignificant and the path length change is very well approximated by equation 2. The facets of fiber ends 1' and 1" need not be parallel, as depicted in FIG. 2B, as long as the orientation of the receiving end obeys Snell's Law within the numerical aperture which is the angle of acceptance of the single mode fiber. It is important, however, that the moving fiber end face, be it emitting or receiving, must be oblique with respect to the fiber axis 7. The core of the invention is captured in FIG. 2A. This configuration employs a gap between two fibers with oblique facets, in conjunction with the transduction of the phase of the light in the non-guiding medium.

The previous embodiment has been introduced in conjunction with the gap between two fibers. It should be emphasized, however, that the goal of this invention is to produce a path length change in the non-guiding medium which can be sensed interferometrically at the detector 12. Consequently, the pick-up fiber 5 can be eliminated as long as the light ejecting from fiber end 1' is allowed to reach the face of the detector 12 where it displays its phase effects through interference with the light in arm 2 which may itself be non-guiding.

Figure 3A:
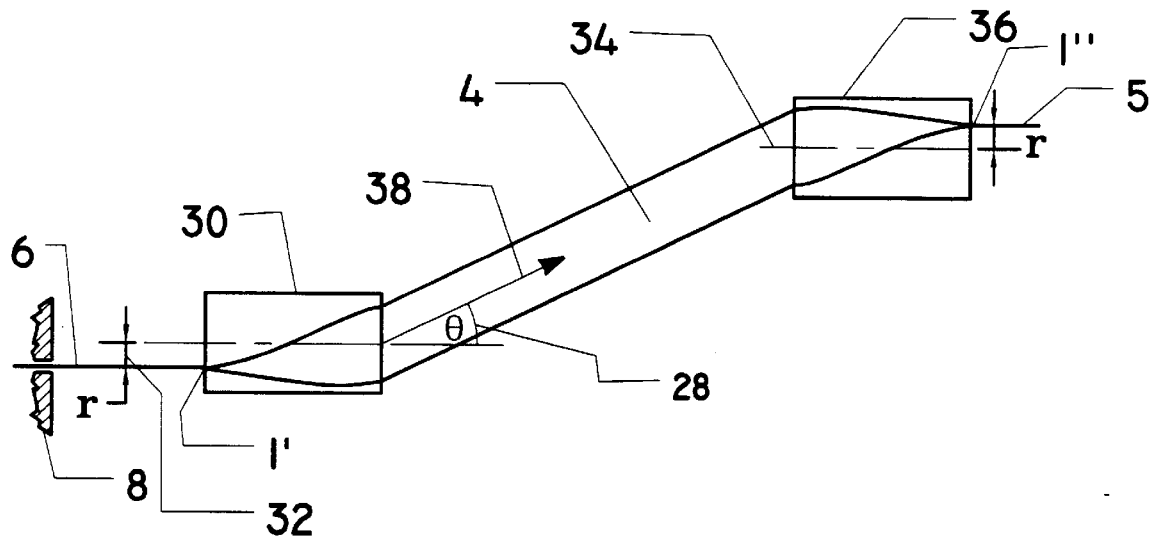
FIGS. 3A and B is a schematic diagram of a second embodiment using graded index lenses.
Figure 3B:
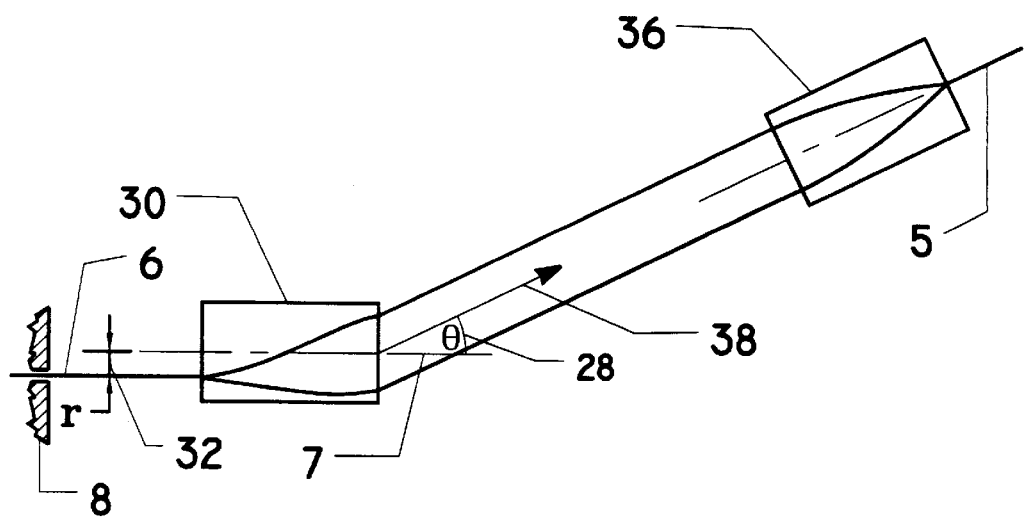

In a different embodiment which also makes use of refraction to sway the direction of the light in a gap 4, the non-guiding medium may include lenses as well as free-space propagation as shown in FIGS. 3A and 3B. A quarter-pitch GRIN rod emitting lens 30 is used to collimate the light coming out of the fiber cantilever 6 and quarter-pitch GRIN rod receiving lens 36 focuses it on the pick-up fiber 5. At the fiber end 1' the lens is glued to the fiber cantilever and becomes an inertial mass which increases the sensitivity of an accelerometer. If the fiber end 1' is displaced eccentrically from the center of the lens then the collimated light 34 emerges in the gap 4 at an angle θ 28 with respect to the axis of the lens. This has the same effect as slanting the facet of the fiber end. The angle θ 28 is now proportional to the eccentricity r 32 between the fiber and the centerline of the lens. When r=0 the light emerges parallel to the axis of the lens, i.e. θ=0 and there is no path length change, and when r=R the radius of the lens, then the light emerges at the numerical aperture which is the angle of acceptance of the lens. The eccentricity r 32 must be chosen to produce an angle θ 28 in between these values. The path-length change between emitting lens 30 and receiving lens 36 is equal to the projection of the cantilever-tip displacement 16 on the direction of propagation of light 38 between the two lenses and is given by Equation 2. Since the light is collimated in the gap 4, the distance between the lenses can be extended and need not be confined to a few microns as is the case with two bare fiber ends. Also the lens eases alignment and insertion problem because it always focuses the collimated light at a certain point on the back focal plane where it is picked up by the fiber no matter where the light falls on the front surface.

Figure 4A:
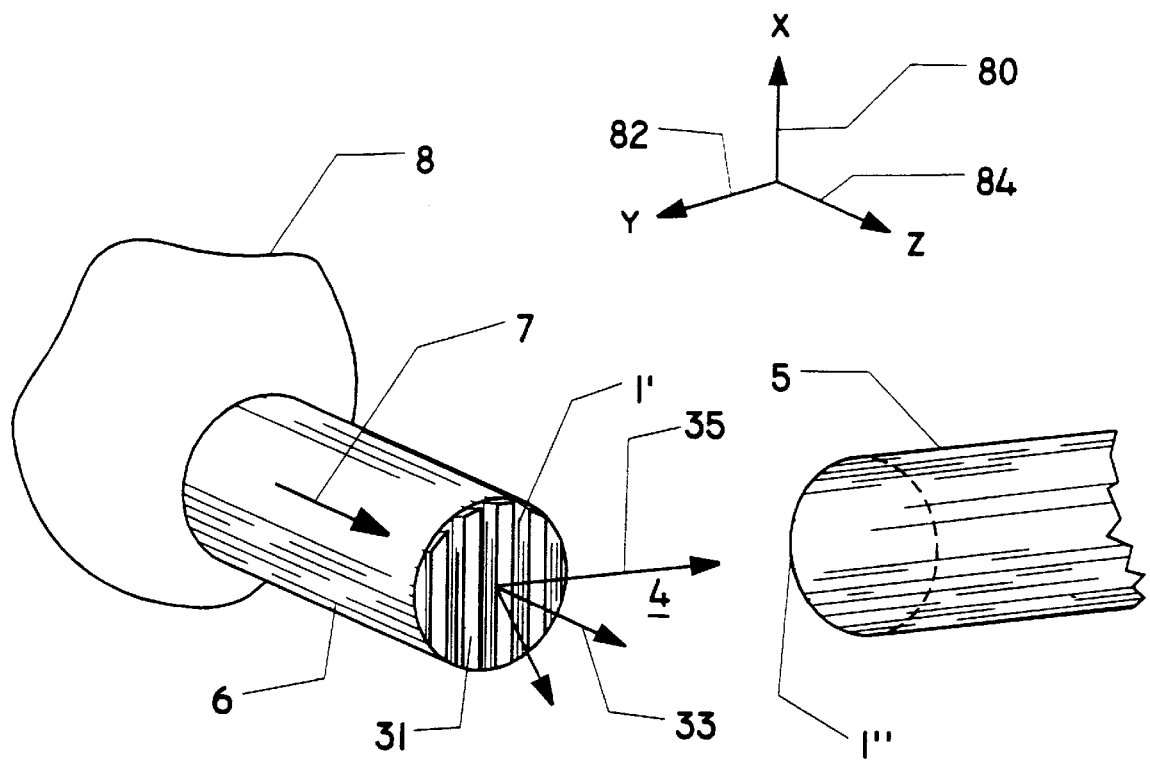
FIGS. 4A and B is a schematic diagram of a third embodiment using a diffraction grating.
Figure 4B:
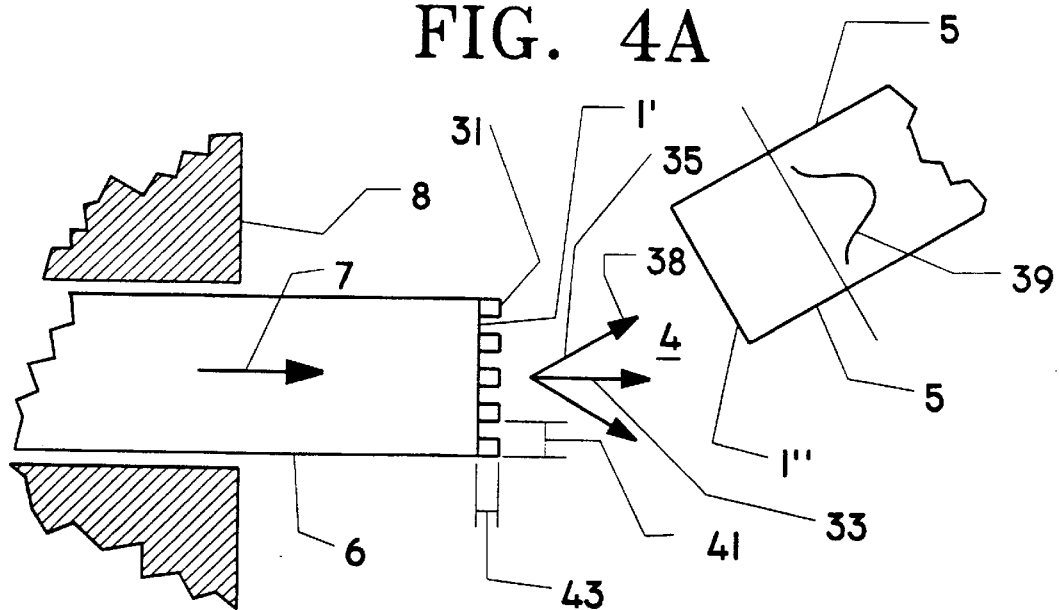

Redirection of the light at the interface between the guiding and non-guiding media, in the embodiments illustrated above was effected by refraction. Alternatively, diffraction can be used to redirect light at the interface. In another embodiment a grating 31 is inscribed on the face of the fiber end 1', as shown in FIG. 4. A grating redirects the incident light in certain directions where light interferes constructively. The grating 31 yields many diffracted orders 33, 35 etc. in the gap 4, depending on the ratio of the wavelength of the light to its period 41. One of these orders, not aligned with the waveguide axis 7, is picked up by the fiber 5. When a grating 31 is used, the face of fiber end 1' may or may not be inclined with respect to the fiber axis 7, i.e. refraction can be used with diffraction. If the face of fiber end 1' is normal to the axis 7 then the zeroth order 33 of diffraction cannot be used. If the grating lines 31 are parallel to the x-axis 80 then the orders 33, 35 of diffraction are located in the y-z plane 82–84. Such gratings can be made holographically. Its period 41 must be slightly larger but of the same order of the wavelength of light in order to separate the diffracted orders spatially. Also the modulation depth 43 of the grating 31 must be comparable to the wavelength in order to divert appreciable amounts of optical energy from the zeroth order 33 to the other orders 35.

Figure 5:
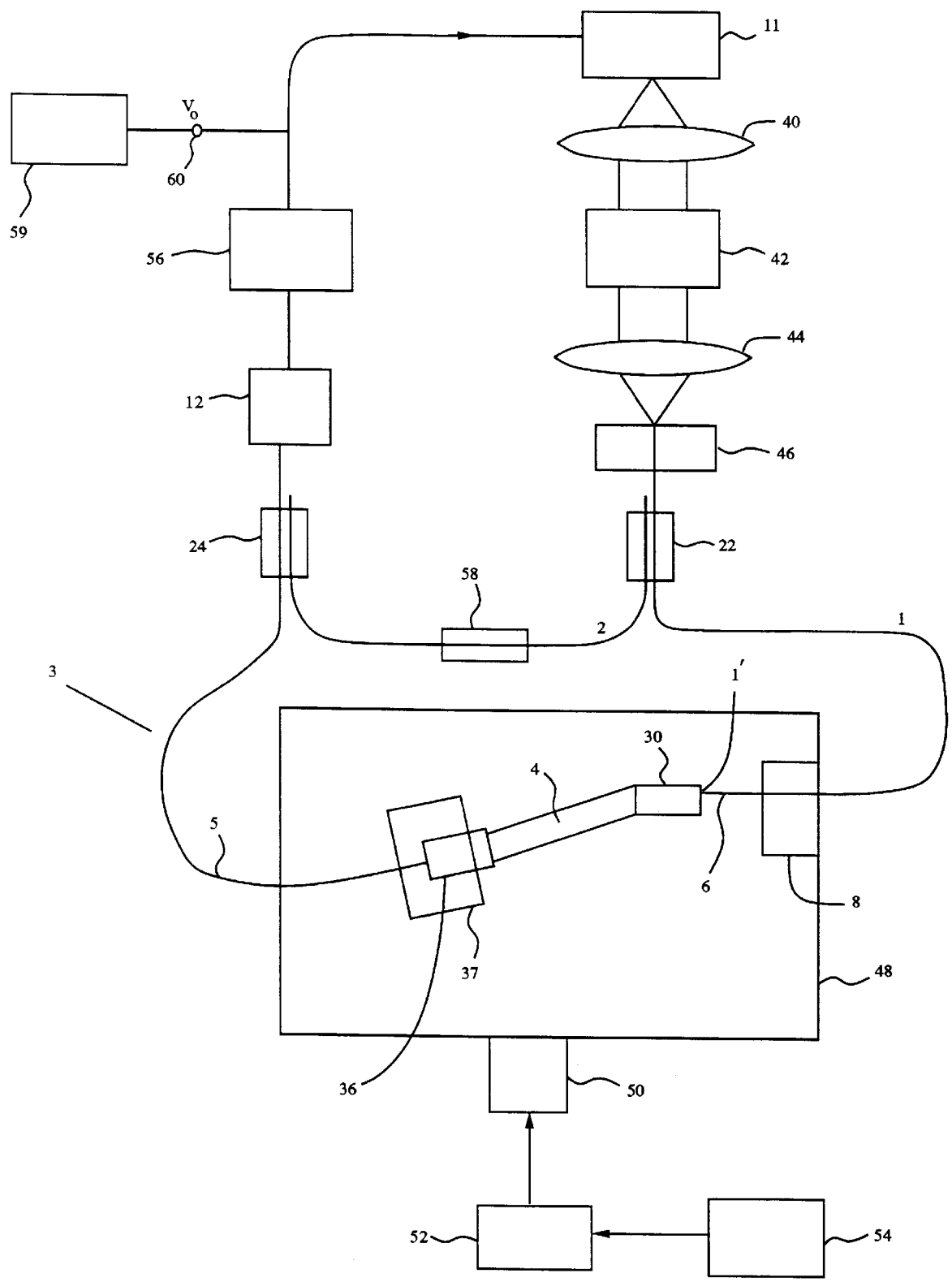
FIG. 5 is a schematic diagram of an experimental set-up.

The Mach-Zehnder accelerometer of FIG. 1 modified to include GRIN rod lenses according to FIG. 3 was built on a levitated optical bench. The set up is illustrated in FIG. 5. A laser 11, in this case a laser diode, emits at a wavelength of 0.83 micron. Anti-reflection coated infrared collimating and focusing optics 40, 44 couple light into a fiber. A fiber chuck 46 holds the tip of the fiber for end coupling. The interferometer also has two single mode optical fiber arms 1 and 2, an optical detector 12, and servo feedback 56 which drives the laser 11. Light entering one end of the fiber splits at splitter 22 into arms 1 and 2 and recombines at combiner 24 to create an interference. Optical fiber arm 2 passes through a splice 58. A 50 dB isolator 42 is inserted in the optical path to reject optical feedback and reduce noise. The fiber cantilever 6 carries a first quarter-pitch GRIN emitting lens 30 at its free end 1' and is held tightly at its fixed end under contact pressure of miniature prongs in clamp 8. A second quarter-pitch GRIN receiving lens 36 is fastened tightly in holder 37. Clamp 8 and holder 37 are fastened onto a rigid brass plate 48 which is supported by a sheet of foam underneath. The plate is tied on one edge to a magnetic coil shaker 50 (B&K Model 4810). Shaking was done horizontally in order to avoid loading the shaker statically, thus driving the shaker outside its linear range. The magnetic shaker is driven by a function generator 54 through an amplifier 52. The function generator is capable of generating sinusoidal drives as well as random noise and has the capability to sweep the single frequency drive over the bandwidth of interest. The voltage output $V_o$ 60 of the servo feedback 56 is the output of the accelerometer and is proportional to acceleration. $V_o$ is fedback to the diode laser 11 and analyzed with a digital spectrum analyzer 59 capable of displaying the frequency content of the vibration and the transfer function of the fiber cantilever with the sweep or random noise features of the function generator 54.

The single-mode fiber cantilever was stripped of its protective plastic coating. The stripped fiber has an outside cladding diameter of 125 microns and a core diameter of 5 microns. The lens 30 has a length of 5 mm and a radius of 0.9 mm corresponding to a numerical aperture of 0.46 on axis, and weighs $3\times10^{-5}$ Kg. The beam was collimated to a diameter of 400 microns in the gap so that lenses 30 and 36 could be spaced up to 1 inch apart. The configuration of FIG. 3B was used for the fiber cantilever 6 and the receiving lens 36; the fiber tip 1' was distanced off center by an eccentricity 32 of r=0.625 mm producing an angle θ 28 of 20° (0.34 radian). The length of the cantilever 6, hence, its sensitivity and its natural frequency is altered by sliding the fiber in its clamp 8. For a length of 4.7 mm, for example, the cantilever 6 has an undamped natural frequency of 80 Hz; the lateral motion of the lens y 16 is about 50 microns; and its angular rotation is 7 mrad for 1 g of acceleration. This produces twenty-two fringes in the interferometer or a phase change φ of 2 π(22)=138 rad/g according to equations 2 and 3, which is highly sensitive.

The transfer function of the optical accelerometer shows clearly the resonance of the cantilever at 80 Hz. This accelerometer with a cantilever 4.7 mm long has a useful bandwidth from DC up to 50 Hz. The transfer function represents the ratio of servo voltage output to shaker drive voltage at a particular excitation frequency. This ratio is 0.165 at frequencies below 50 Hz. Knowing that the magnetic shaker has a characteristic of 46.7 mg/V of shaker drive according to manufacturer specification, yields a measured scale factor of 3.53 V/g for the accelerometer, which is in close agreement with a theoretical sensitivity of 3.50 V/g. The quality Q of a mechanical resonator, defined as the ratio of resonant frequency to linewidth at half-maximum power is estimated to be Q=24. Q is also related to the damping coefficient ζ as Q=½ζ, from which the damping coefficient of the fiber cantilever is calculated to be 2.1%. The phase of the transfer function displays a familiar phase profile of a second-order resonant system. The phase shift by π is due to the negative sign in the proportionality constant between force and voltage.

A series of tests were conducted by varying the length of the fiber cantilever and measuring its natural frequency and the scale factor of the accelerometer. The accelerometer was modeled as a two-degrees-of-freedom massless cantilever with an extended inertial mass at its tip. The results gave good agreement between theory and experiment. The linear and angular displacements of the tip of the cantilever were also simulated on a computer by varying the cantilever length. It was calculated that, for a length of 4.7 mm, linear displacement y 16 of the cantilever tip is about 50 microns for 1 g of acceleration which closely agrees with the measured value, and that angular deflection is 7 milliradians. Such rotation is small compared to the original angle θ 28 of light in the gap so that the path length change is well approximated by equation 2.

The previous embodiments were introduced in conjunction with a fiber cantilever, when the fiber or waveguide is substantially coincident with the neutral axis of a cantilever which has only lateral displacement normal to the axis of the fiber. Refraction or diffraction is used at the interface in order to redirect the light in the gap so that the lateral motion has a component along the direction of the light in the non-guiding medium and produces a proportional path length change. It is realized that points on the cantilever substantially distant from the neutral axis have both transversal and longitudinal displacement. The same result can be achieved alternatively by terminating the waveguide at a point on the cantilever where displacement has a substantial component along the axis of the waveguide. This naturally produces a path length change in the non-guiding medium without use of either refraction or diffraction. Nevertheless, the end facet of the fiber or waveguide could still be inclined or contain a diffractive element as long as the displacement of the waveguide termination point has a substantial component along the direction of light in the non-guiding medium.

An interferometer measures the phase difference φ between two interfering beams. The phase difference creates an intensity change I according to the equation $$I = I_o \cos^2 \frac{\phi}{2} \quad (4)$$

where $I_o$ is the intensity of light source. This phase difference can be measured as a function of intensity change but there are three major problems:

1. The relationship between I and φ is nonlinear complicating the signal processing.
2. The sign of the phase change is ambiguous.
3. Output is susceptible to source intensity fluctuations reducing signal-to-noise ratio.

For these reasons, phase-locked detection with servo feedback is used to close the loop around the interferometer. The servo feedback 56 provides a compensating phase change equal in magnitude but opposite in sign to that produced in the gap 4 due to deflection of the cantilever 6, so that the phase difference between arms 1 and 2 of the interferometer remains constant. The output 60 of the servo is a voltage proportional to the phase change resulting from displacement 16 of the tip of the cantilever 6. The servo feedback 56 has a high-gain stage amplifier 52 which insures that the difference between the cantilever-induced phase and the phase fedback is virtually null, the ideal phase tracking for phase-locked operation. The feedback also employs high speed phase modulation 64 and demodulation 66 at a frequency much higher than that of the measured signal. This provides a zero-crossing of the demodulator output 68 which insures that the servo output 60 is completely independent of intensity fluctuations of the light source 10. Thus, the servo feedback solves the three problems outlined above.

Figure 7:
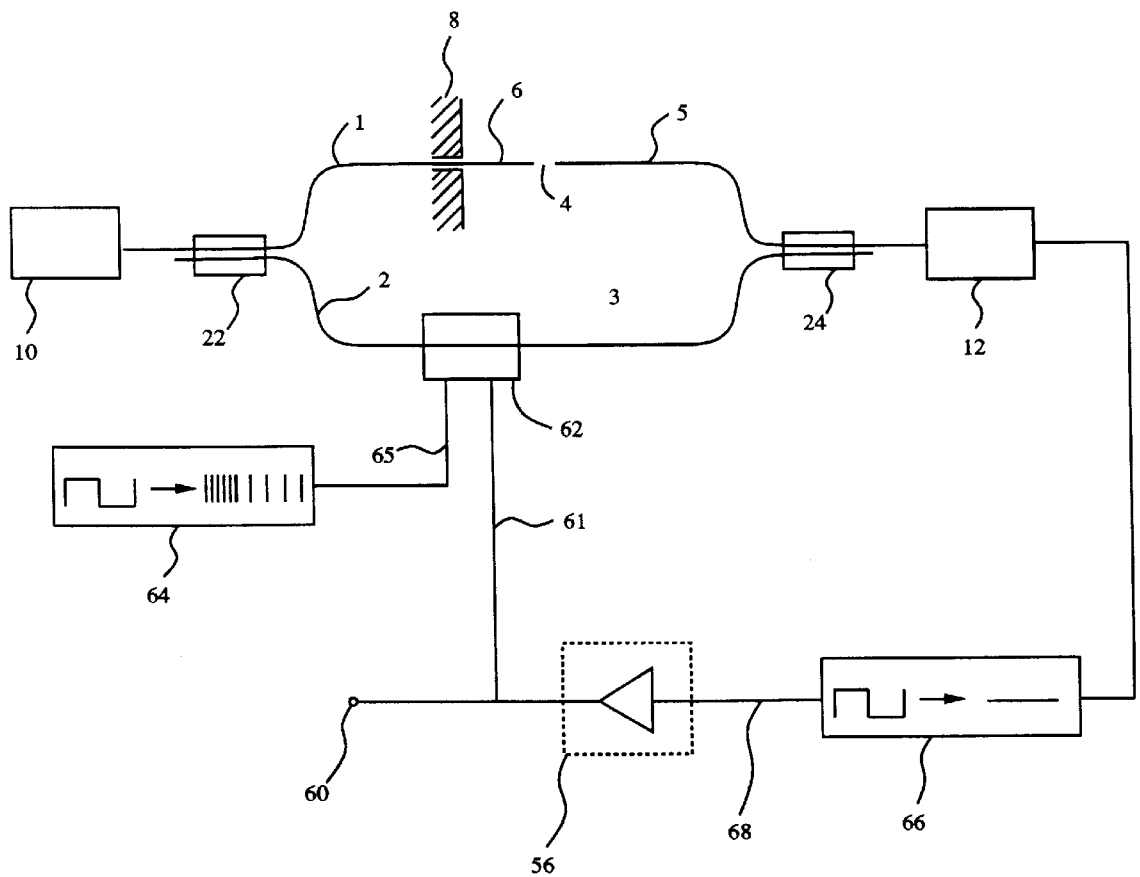
FIG. 7 is a schematic diagram of a displacement sensor having an equal arm Mach-Zehnder interferometer with servo feedback in one arm.

So far we have specified neither coherence of the light source 10 nor initial pathlength difference in the interferometer 3. The path length difference in an interferometer is set close to zero in very high accuracy applications in order to cancel the effect of laser noise and to extend the dynamic range of the measurement. If the two optical fiber arms 1 and 2 are made equal then the light source 10 can have a broad spectral width and does not have to be a laser. In this case feedback and phase modulation cannot be done through a light source but rather through one or both arms of the interferometer 1 or 2. This is usually done piezoelectrically, electro-optically or acousto-optically. A phase modulator 62 can be formed from a piezoelectric element such as crystal or ceramic like PZT and used to strain the optical fiber axially. Alternatively, electro-optic phase modulators which use Pockels or Kerr effects in crystals such as $LiNbO_3$ to change the index of refraction can be used. The acousto-optic effect in crystals such as $LiNbO_3$ or Quartz is used to produce a shift in the optical frequency of the light. The idea is to change the optical path length of one arm 2 to effect a high speed phase modulation and compensate for the change in the optical path length of the other arm 1 due to deflection of the cantilever 6. A schematic of the equal-arm accelerometer is shown in FIG. 7.

Figure 8:
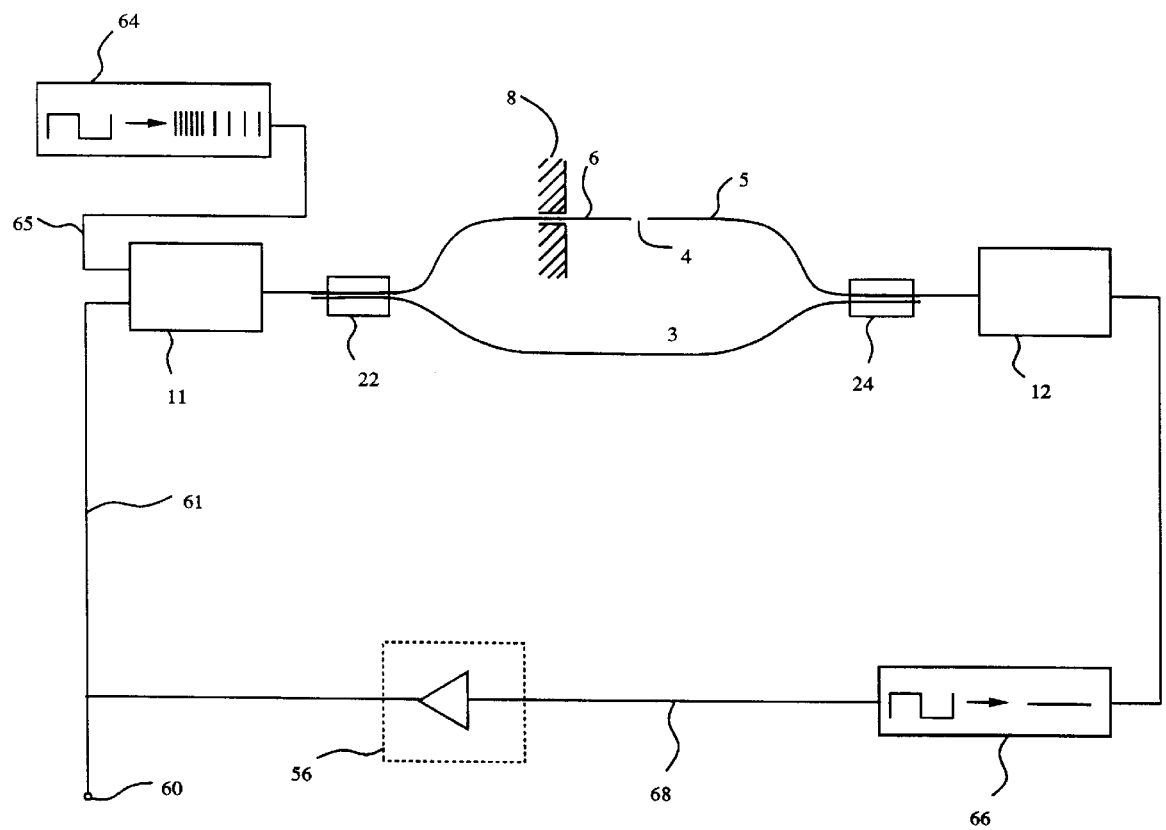
FIG. 8 is a schematic diagram of a displacement sensor having an unequal arm Mach-Zehnder interferometer with laser feedback.

If optical fiber arms 1 and 2 are unequal, it is possible to process feedback as well as phase modulation through a laser 11 as shown in FIG. 8. This alternative eliminates the need for a separate phase modulator, which is often bulky and expensive. However, if the two arms are unequal, then the light source must have a coherent length larger than the path-length difference L in order to obtain good visibility of interference fringes. L varies typically from 1 cm to 1 m depending on the dynamic range of the measured parameter. For this reason single longitudinal mode lasers with long coherent lengths are often used in interferometric sensors. If the current of a laser is perturbed, changes in optical frequency occur which cause a phase difference across an unequal-path interferometer. Use of a laser diode facilitates changing its current and has a linear dependence of its wavelength on the forward junction current through a wide dynamic range. This yields very compact low power sensors.

Figure 9:
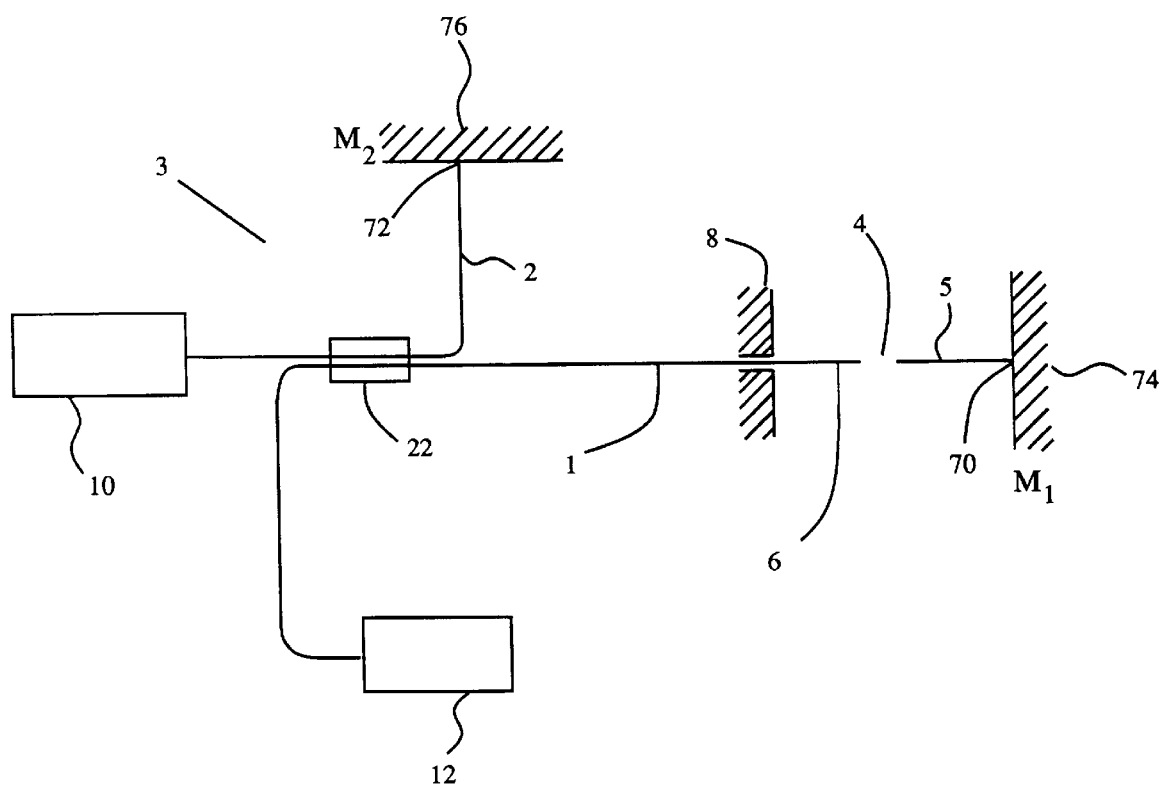
FIG. 9 is a schematic diagram of a displacement sensor in a Michelson interferometer.

The disclosed invention produces a path length change in a non-guiding medium proportional to the lateral displacement of the fiber end and is not tied to any particular interferometer configuration. So far we have covered embodiments based on the Mach-Zehnder interferometer. It can equally be easily incorporated into a Michelson interferometer as shown in FIG. 9. The ends of both branches of the interferometer 70 and 72 are terminated at mirrors $M_1$ 74 and $M_2$ 76 which reflect light back into the fiber. Since light crosses the gap 4 twice, the sensitivity of the Michelson interferometer is twice that of the Mach-Zehnder. All the ramifications and variations considered before for the Mach-Zehnder apply to the Michelson configuration.

Figure 10:
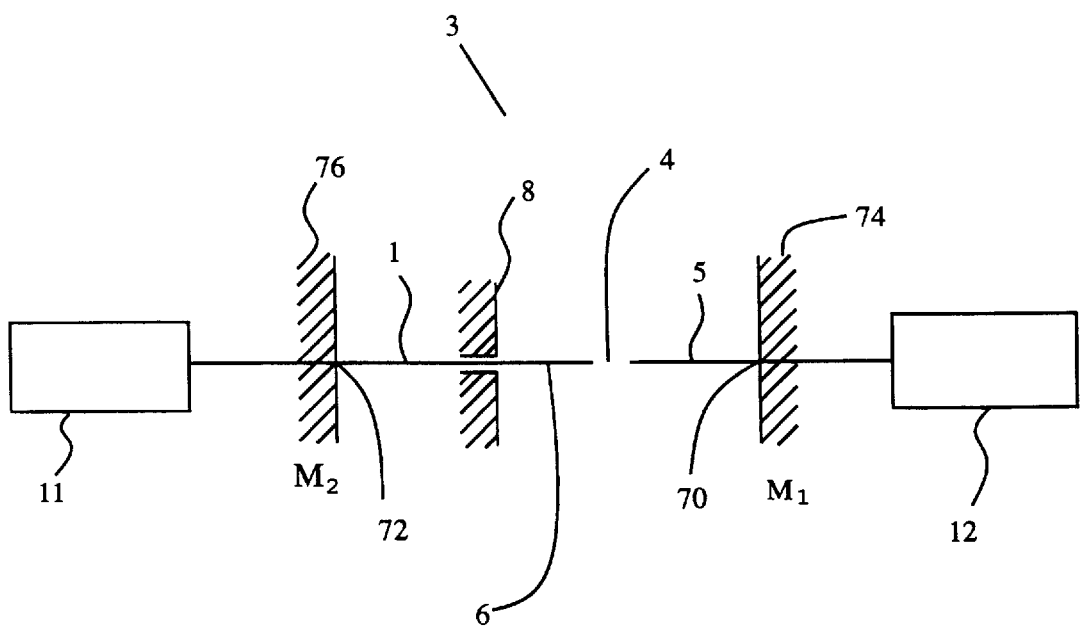
FIG. 10 is a schematic diagram of a displacement sensor in a Fabry-Perot interferometer.

The same principle applies to with a multiple-beam interferometer (Fabry-Perot resonator), as shown in FIG. 10. Partially reflecting mirrors $M_1$ 74 and $M_2$ 76 set up multiple-beam interference in the cavity between them and the light makes many passes through the gap 4 which is situated within the cavity. Flexure of the cantilever 6 causes a shift in resonant frequencies of the Fabry-Perot cavity. The Fabry-Perot configuration presents advantages over the previous configurations since the absence of a reference arm tends to reduce system sensitivity to unwanted environmental perturbations. Similarly, all ramifications and variations considered for the Mach-Zehnder apply to the Fabry-Perot configuration.

It is often desirable to measure displacement in only one preselected direction. Accelerometers are usually uniaxial, i.e. they measure acceleration along a single direction. For this reason, three such accelerometers arranged along orthogonal axes are usually deployed to measure the total three dimensional acceleration field at a particular location. This is also true of acoustic sensors, such as hydrophones, when it is desirable to determine an acoustic field emanating from a certain direction. Arrays of hydrophones are employed to achieve directionality. Therefore, displacement sensors should be designed to respond to uniaxial displacements and to eliminate cross-axis sensitivity. This is of special concern with fiber optic cantilevers since the optical fiber is equally compliant in both lateral directions normal to its axis. This presents a problem in intensity measuring schemes because motion of the cantilever tip in either lateral direction causes a change in intensity coupled across the gap 4.

It is worth noting that the phase transduction scheme of the disclosed invention overcomes this difficulty. The direction of the light 38 in the non-guiding medium and the axis 7 of the waveguide define a plane since these two directions are not parallel. Only lateral displacement of the fiber cantilever tip 1' in this plane can contribute to a path length change. Lateral displacement normal to the plane does not produce any path length change except for intensity modulation which is inconsequential in phase-sensitive detection associated with servo feedback. This is because the facet of fiber end 1' is inclined in that plane. Phase modulation occurs only for lateral displacements in plane of refraction or diffraction. Thus, this invention has the advantage that the displacement sensor can be made uniaxial, i.e. measuring the field only along a pre-selected direction and ignoring the field in other directions even when the cantilever carrying the waveguide is compliant and flexes in both lateral directions in response to a field being applied along these directions. This is often desirable. This distinguishes this method from other methods which employ a fiber cantilever arrangement for the measurement of displacement.

Fiber optic sensors have practical drawbacks which restrict their widespread use in industry. They exhibit significant thermal drift and are unreliable because of the large number of components that are hand assembled. Further, assembling a fiber-optic sensor requires intensive, skilled labor which is expensive. This prevents fiber optic sensors from penetrating markets where they would outperform other conventional sensors. Commercial applications require reliable, low cost sensors.

Assembly of an extrinsic sensor with the use of single mode fibers is tedious because of the reinsertion problem. The distance between fiber ends 1' and 1" must be kept below 10 microns and the offset between their axes below 1 micron to obtain good coupling between the fibers. It is difficult and time consuming to align and orient fiber ends to these tolerances. It is even more difficult to maintain the alignment over time because of creep in structures supporting the fibers.

Optical fiber cantilevers are not advantageous in some situations. First, under some circumstances it would be more advantageous to distance the waveguide from the neutral axis of a cantilever. This is not possible if the fiber itself is used as a cantilever. Second, in an accelerometer it is often desirable to produce critical damping to extend the bandwidth. Damping on a cantilever can be continuously controlled using electrodynamic feedback. This type of feedback is frequently contemplated for vibrating structures because it confines structural deformations to an elastic regime where the mechanical properties of the material are well known. This provides the highest degree of linearity and repeatability in the cantilever response. However, force feedback cannot be realistically implemented on a fiber cantilever.

Some shortcomings of fiber-optic sensors can be overcome with integrated-optic technology. The interferometer shown in FIG. 1 uses all-fiber components which makes it completely compatible with integrated-optics and readily transferable to the solid-state domain. Deposition of high-quality thin film waveguides of silica ($SiO_2$) on silicon (Si) is combined with silicon micromachining to produce integrated sensors of unmatched performance. The cantilever is microfabricated in the silicon substrate and the waveguide deposited on the surface. Silicon is suggested as a base material because of its abundance, widespread use in the semiconductor industry, and availability of many techniques for processing it. However, other semiconductor materials such as Gallium-Arsenide can also be used. There are also a variety of techniques and materials which can be used to deposit or diffuse waveguides into the substrate. The mechanical properties of high-purity single-crystal silicon make it an ideal material for micromechanical structures. The silica thin film can be deposited on a semiconductor wafer with chemical vapor deposition (CVD) or flame hydrolysis deposition (FHD) techniques where the film is the product of a chemical reaction. The chemical reaction takes place either in the space above the semiconductor wafer or on the surface of the wafer directly. Alternatively, a semiconductor wafer can be coated with a silated photoresist which transforms into silica after exposure to an oxygen containing plasma. Subsequently, the silica thin film is doped with certain materials to raise the index of refraction of the core and form the waveguide. Ridge or channel waveguides 86 can be made from a thin film 88 with the use of plasma etching. Silica is particularly advantageous because it yields waveguides whose profiles most closely match those of single mode fibers.

Figure 11:
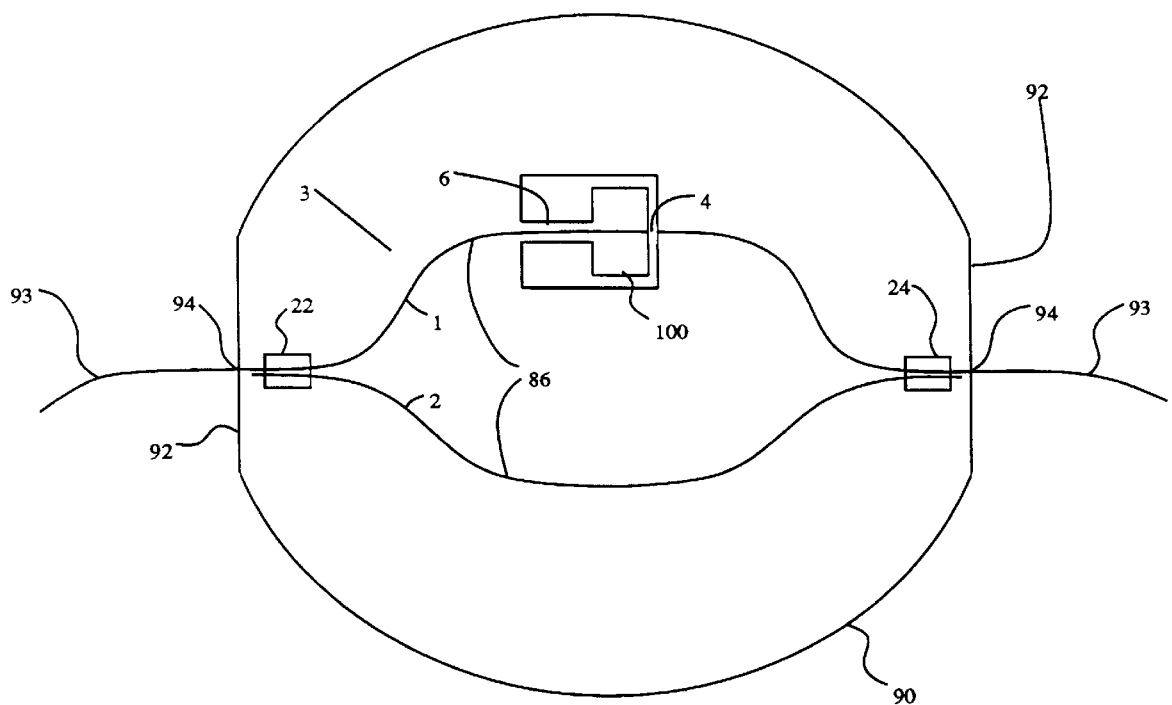
FIG. 11 is a schematic diagram of a Mach-Zehnder integrated-optic displacement sensor.

A whole interferometer 3 can be defined on the surface of a semiconductor wafer 90, as shown in FIG. 11. The edges of the silicon wafer are diced and the optical fiber 93 joined to the clean edge 92 at the ridge waveguide edge termination point 94. Light entering the optical fiber is butt-coupled to the ridge waveguide. This configuration has the advantage that a light source 10 and optical detector 12 can be either butt-coupled to the wafer edge 92 or connected remotely to the interferometer via an optical fiber. The latter configuration allows greater flexibility and extends the range of applications of the displacement sensor to situations where there is significant electromagnetic or thermal interference. The optical portion can be placed in the interference zone while susceptible electronic parts are located remotely communicating with the rest of the interferometer via optical fiber 93. The splitter 22 and combiner 24 are made similarly to optical fibers by bringing two ridge waveguides in close proximity over the proper interaction length.

One advantage of integrated-optic technology is that it yields very compact sensors and allows greater levels of integration. Another is the use of masking and photolithographic technology which allows precise control over dimensions of the optical circuit. Any optical path length difference of up to a few centimeters can be obtained with submicron accuracy by designing the mask properly. This is one of the main reasons for going from fiber-optic to integrated-optic technology which is afforded by virtue of the extrinsic nature of the sensors. It is beneficial to the design and alignment of the gap since its dimensions must be controlled precisely within micron level tolerances. This is crucial to fabrication of extrinsic interferometric sensors.

Figure 13:
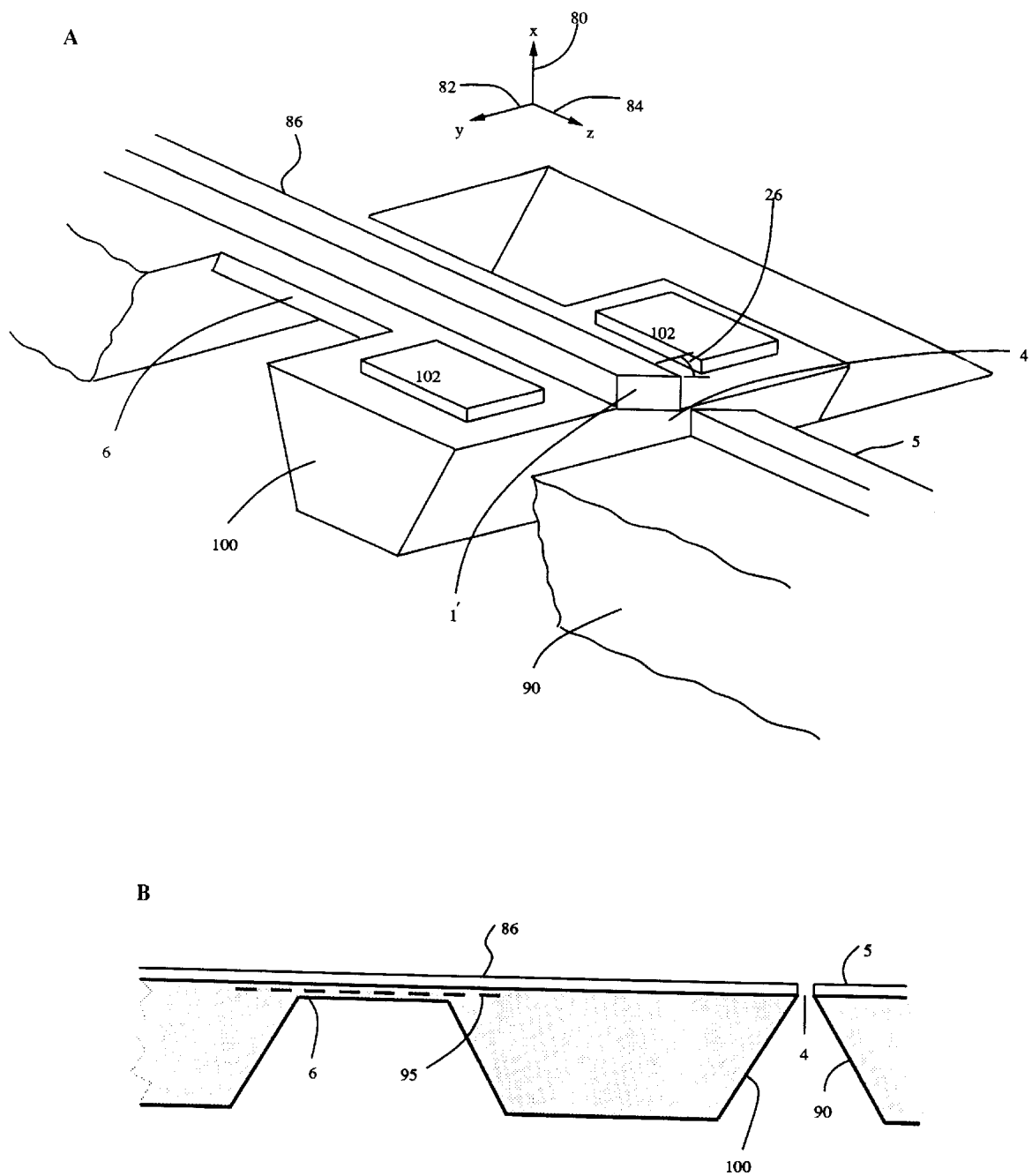
FIGS. 13A and B is a schematic diagram of a micromachined cantilever and deposited waveguide with refraction at the interface. A: perspective, B: cross-section.

Miniature, as well as macroscopic, cantilever beams can be defined on a silicon wafer by using its crystallographic etching properties. A ridge waveguide 86 is laid over a cantilever 6 and is carried with it as it flexes. It is often desirable to include a proof mass 100 at the tip of the cantilever to tailor its frequency response and sensitivity. This is done monolithically in silicon using anisotropic chemical etching. Starting with a double-sided polished wafer 90 silica ($SiO_2$) layers 88 are deposited on both sides of the wafer. The upper layer is for waveguiding while the lower layer is for masking the silicon from subsequent anisotropic etch. After a few photolithographic steps, which are standard in the microelectronic industry, surfaces of the silicon are exposed within narrow openings in the oxide layers. These openings are defined by photomasks which have the forms of the cantilever and the proof mass. The method of manufacture of these masks is also well known. FIGS. 12A and 12B are schematic diagrams of masks used for top and bottom sides, respectively. A ridge waveguide 86 about 10 to 15 microns thick and wide is made from the top silica layer with the use of plasma etching. The facet inclination angle 26 at the tip of the ridge waveguide adjacent to the gap 4 is shown in the top mask. The formation of the mass by chemical etching proceeds from the bottom of the wafer to the top to free the cantilever. Since silicon etches anisotropically according to its crystallographic orientation the shape of the mass is trapezoidal. Subsequently, the remainder of the silica layers 88 except for the ridge waveguide, is removed using wet isotropic etching. FIG. 13 illustrates the silicon cantilever 6 and the proof mass 100. An etch stop layer is incorporated in the silicon in order to control thickness of the cantilever. Conducting electrodes 102, usually made of polysilicon or metal, are deposited on top of the mass or cantilever to provide means for actuation of the cantilever through electrodynamic force feedback.

The etch stop layer is made by diffusing dopant degenerately in the upper crust of the wafer. Cantilevers fabricated with the use of etch stop layers are usually only up to a few microns thick. Thus, for practical purposes the neutral axis of the cantilever lies in the upper surface of the wafer. It is a tendency of cantilever design to locate the waveguide centrally in the plane of symmetry of the cantilever, as shown in FIG. 13. This makes the waveguide substantially coincident with the neutral axis of the cantilever which has only lateral displacement. Therefore, refraction or diffraction is needed in order to change the direction of light at the interface between fiber end 1' and gap 4 and to produce a path length change proportional to displacement.

Figure 14:
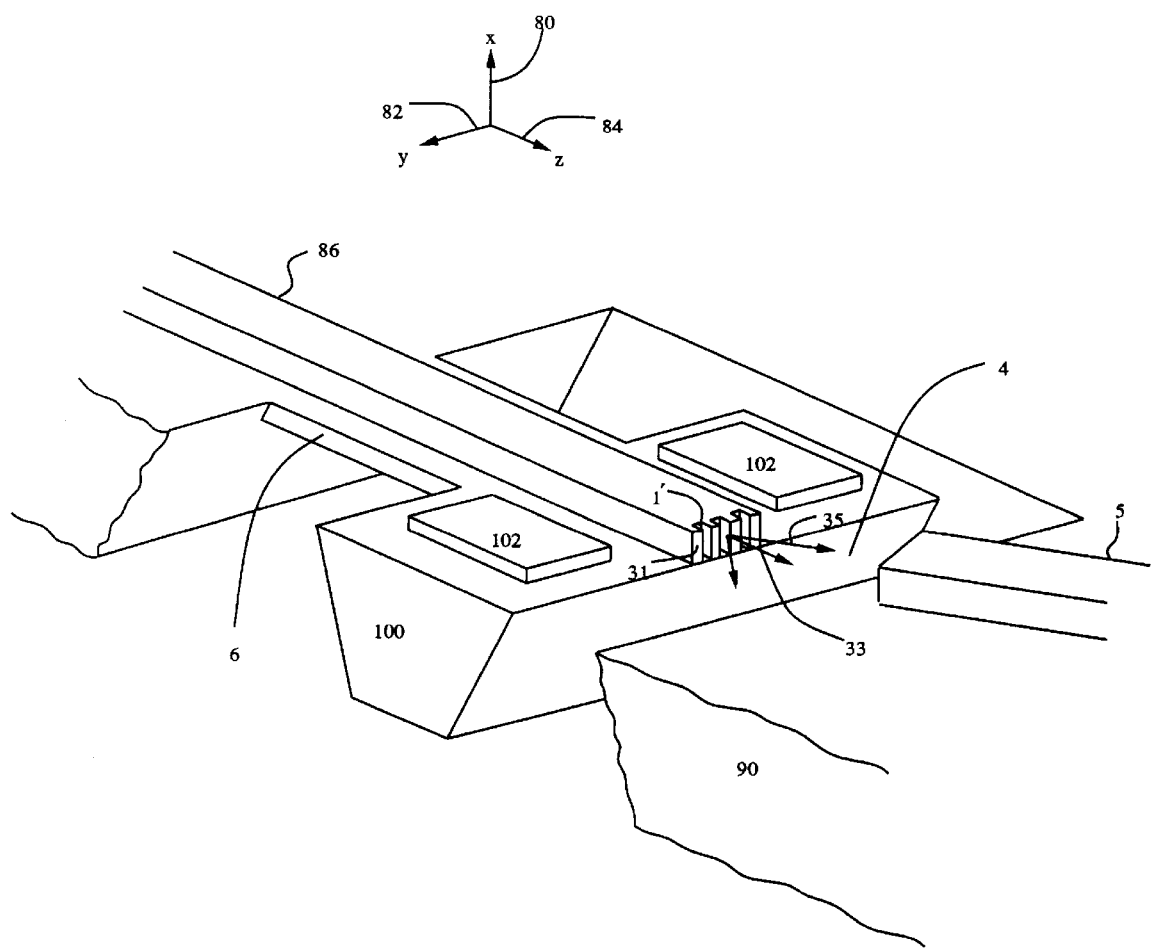
FIG. 14 is a schematic diagram of a micromachined cantilever and deposited waveguide with diffraction at the interface shown in perspective.

Typically, thin cantilevers have a quasi-rectangular cross-section and are much wider than their thickness, so that they are more compliant, i.e. less stiff, to out-of-plane (of the wafer) forces than in-plane forces. Nevertheless, the displacement sensor can be made uniaxial to pick up the displacement along only one axis even in the presence of displacement along other axis, by orienting the plane of refraction or diffraction parallel to the desired axis. The sensor can be made to measure either x-directed 80 or y-directed 82 displacements. However, from a microfabrication point of view it is much easier and more advantageous to cause the refraction or diffraction to be in the plane of the wafer, as shown in FIG. 13 by inclining the etched facet of waveguide end 1' in the plane of the wafer. In FIG. 14 a diffraction grating 31 is inscribed on the tip 1' of the ridge waveguide 86 causing diffraction to be in the plane of the wafer. Fabrication of vertical grooves 31 can be done with the use of reactive ion and plasma etching technologies which are capable of producing deep, smooth vertical walls with high aspect ratios. A pick-up waveguide 5 has been relocated on the surface of the wafer to intercept the desired first 35 or higher order of diffraction.

Figure 15A:
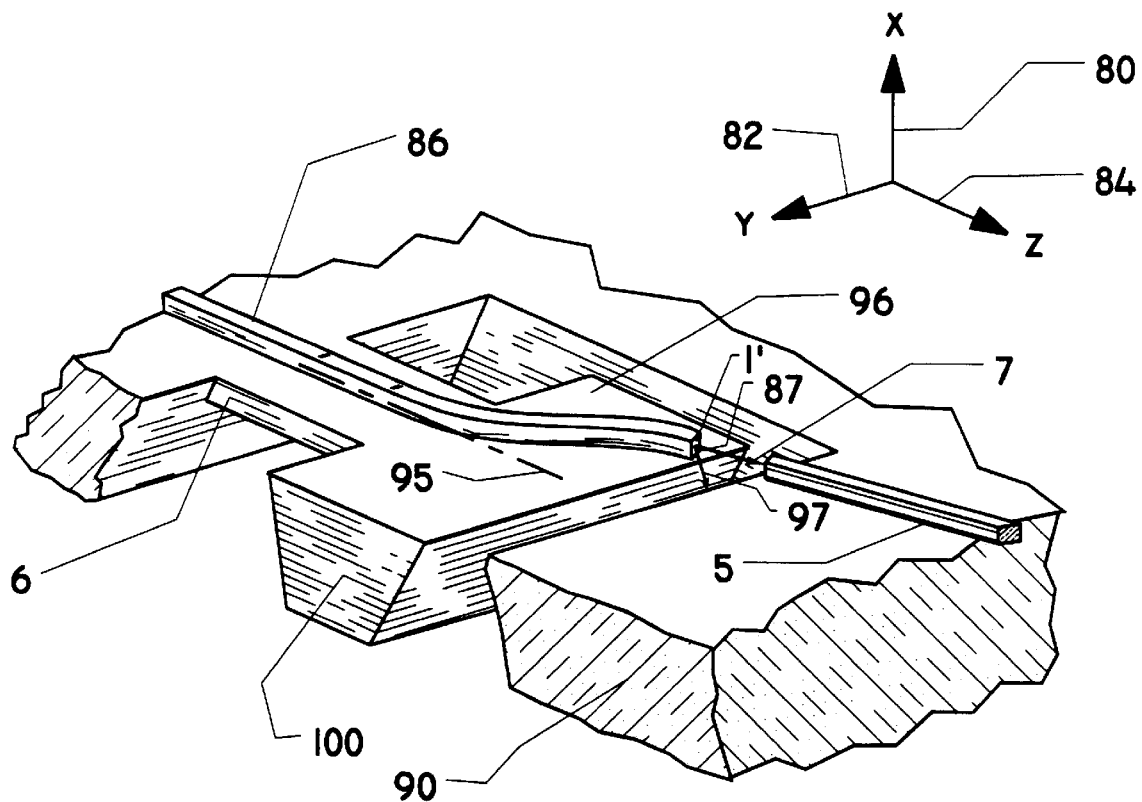
FIGS. 15A and B is a schematic diagram of a micromachined cantilever and deposited waveguide substantially removed from the neutral axis in the plane of the wafer. A: perspective, B: top view.
Figure 15B:
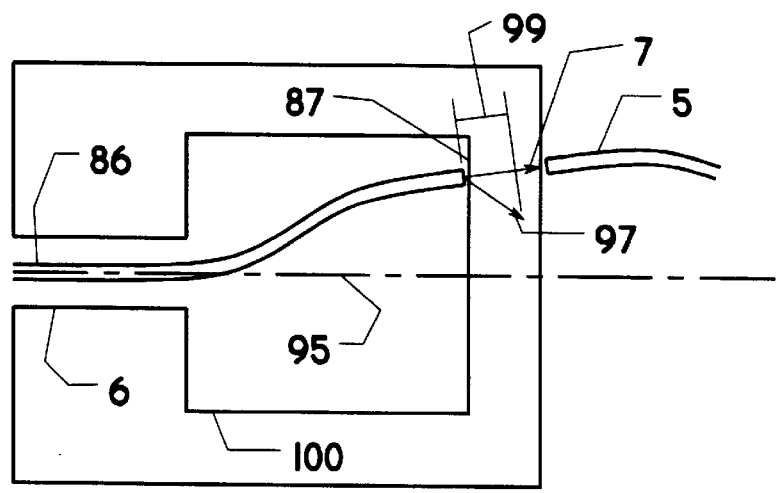

As noted, an alternative way of producing a path length change in the gap is to distance the waveguide from a neutral axis. This is readily feasible with the use of integrated-optics because planar technology offers an extended upper surface of the mass 100 over which the waveguide can be removed substantially away from the neutral axis 95, as shown in FIG. 15. The use of low loss waveguide bends 96 with radii of curvature of only a few millimeters allows termination of the waveguide at a point off the neutral axis on the cantilever 6 or mass 100. Alternatively, the waveguide 86 could still be terminated on the neutral axis but with its axis 7 inclined substantially relative to the neutral axis 95. By analyzing deflection of a micromachined cantilever, displacement of every point on the cantilever and the mass can be charted. It is realized that points off the neutral axis have transversal as well as longitudinal displacements. Our goal can be achieved by terminating the waveguide 86 at any point 87 on the cantilever or mass and orienting it such that the displacement vector 97 at point 87 has a substantial component 99 along the direction of the waveguide axis 7 at the termination point 87. This creates a natural path length change proportional to the displacement. Neither refraction nor diffraction would be needed at that point 87 and the facet of fiber or waveguide end 1' can be oriented normal to the axis 7.

Figure 16:
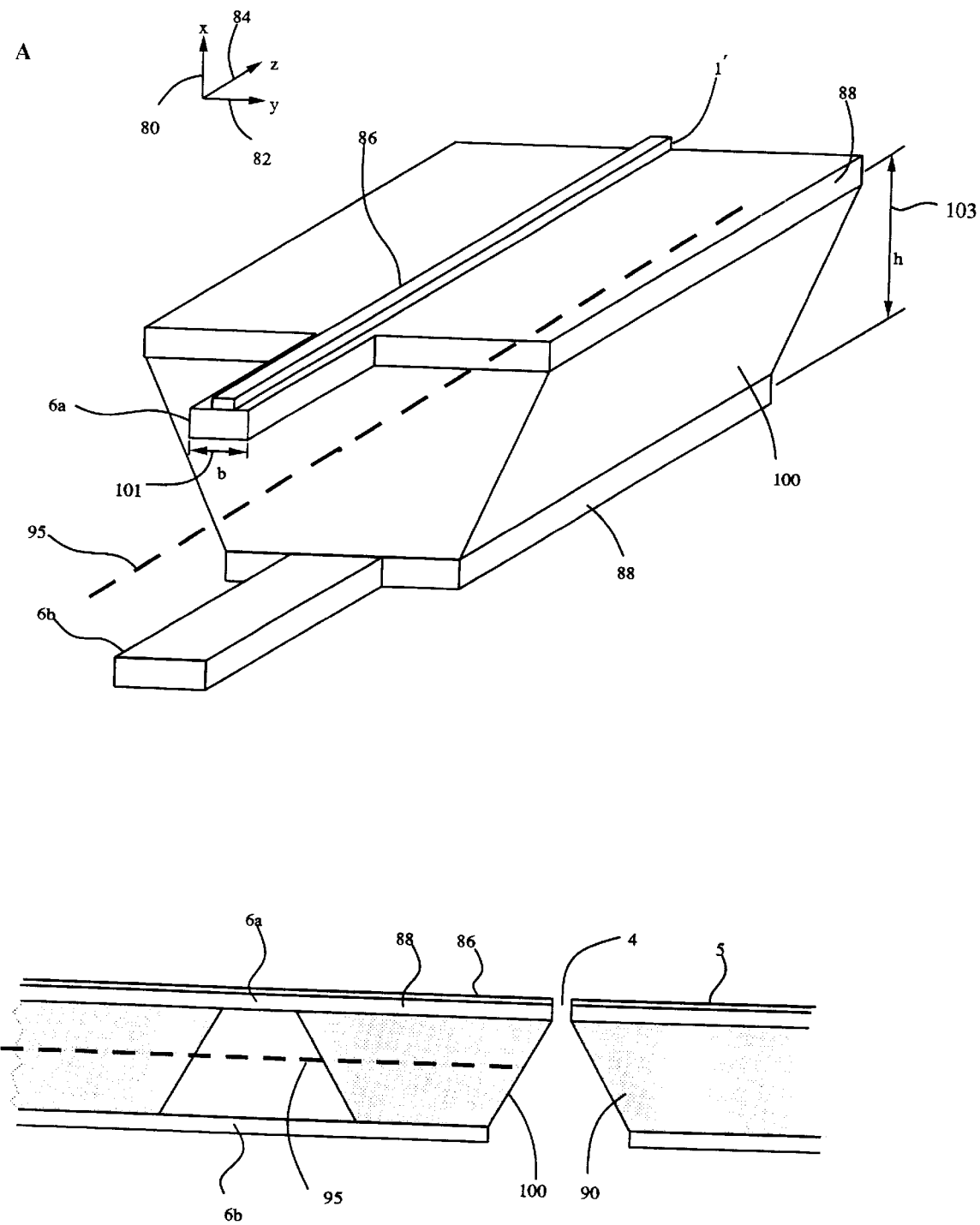
FIGS. 16A and B is a schematic diagram of a micromachined two-prong cantilever beam. A: perspective, B: cross-section.

An alternative way to distance a waveguide from the neutral axis is to move the neutral axis from the upper plane of the wafer since the waveguide is located on the surface. FIG. 16 shows a cantilever made of two prongs 6a and 6b to achieve that while maintaining flexibility of the cantilever. The silicon mass 100 is sandwiched between the two silica layers 88 which are trimmed to form the prongs of the cantilever. Formation of the mass proceeds as before by anisotropic chemical etching along crystallographic planes of silicon. The dimensions of the two prongs need not be identical. Formation of the cantilever does not require an etch stop layer in this case because the oxide is naturally resistant to the chemical etchant of the silicon. The microfabrication process starts by etching anisotropically from the back side to the top to free the mass 100 which becomes suspended between the two silica layers 88. Subsequently, front side anisotropic as well as plasma etching is necessary to free the prongs and define the smooth planar vertical facet of waveguide end 1'. The neutral axis 95 is now in the middle of the wafer at the location where the first moment of inertia of the compound cantilever cross-section vanishes. Therefore, the waveguide is displaced vertically, i.e. in the x-direction 80, from the neutral axis.

The sensor can be made sensitive to either x- 80 or y- 82 displacements of the tip of the cantilever. However, from a microfabrication point of view it would be easier to have the sensitive axis in the plane of the wafer, i.e. along the y-direction. It would be advantageous to design the cantilever so that it is more compliant along the sensitive axis. Displacement transversal to the sensitive axis does not create path length change except for intensity modulation. Thus, it is desirable to minimize displacement normal to the sensitive axis by making the cantilever stiffer in that direction. This is not possible with thin cantilevers, i.e. those made with one prong, because their cross-section is rectangular, with the wider base being in the plane of the wafer. They are more compliant to out-of-plane x-directed forces than to in-plane y-directed forces. Even when the waveguide is removed from the neutral axis as in FIG. 15, it is desirable to make the cantilever more compliant in the plane of the wafer, i.e. along the y-axis 82 because the waveguide still lies in the neutral surface for out-of-plane displacements. This cannot be achieved with a single prong. The two prong design shown in FIG. 16 is advantageous for two reasons: First, relative compliance to x- or y-directed forces can be tailored by adjusting the ratio of the average width of the prong b 101 to the distance between the prongs h 103, b/h. The cantilever behaves as if the cross-section between the prongs were solid. Thus, the cantilever can be made stiffer for out-of-plane x-directed forces by distancing the prongs farther apart, i.e. by using a thick wafer even though each individual prong is more compliant to out-of-plane forces; Second, in a two-prong cantilever it is equally convenient to direct the sensitive axis along either the x- 80 or y- 82 directions without unduly complicating the microfabrication process. This is because the neutral axis can be moved away from the waveguide horizontally as well as vertically, which is not possible with single prong designs. The two-prong design shown in FIG. 16 allows compliance as well as sensitivity along either axis and ease of fabrication.

The disclosure of the invention so far has concentrated on producing a path length change in a gap between two waveguides proportional to the relative displacement of either or both waveguides. The remainder of this disclosure concerns ways of measuring and displaying the resulting phase change. The most common phase detection technique is the use of servo feedback 56, introduced earlier. This yields an analog voltage output 60 proportional to the phase.

Since output of a sensor is often fed to a computer or digital recorder for further signal processing the signal should be in digital form. For this reason, transducers incorporating resonant elements and those which effect modulation of the resonance frequency are often preferred. This simplifies digitizing process since a simple counter can provide and track change of the resonant frequency of a micro-element, whereas more expensive circuitry is needed to effect analog to digital (A/D) conversion in phase modulated systems. In commercial transducers which use A/D electronics the processing unit is responsible for a sizable portion of the cost of the whole transducer. Further, the resonant frequency is immune to the noise producing mechanisms associated with a light source. Thus, the use of a resonant element at the output extends the dynamic range of the transducer. For these reasons resonant type sensors are an attractive alternative and are very sensitive.

Figure 17A:
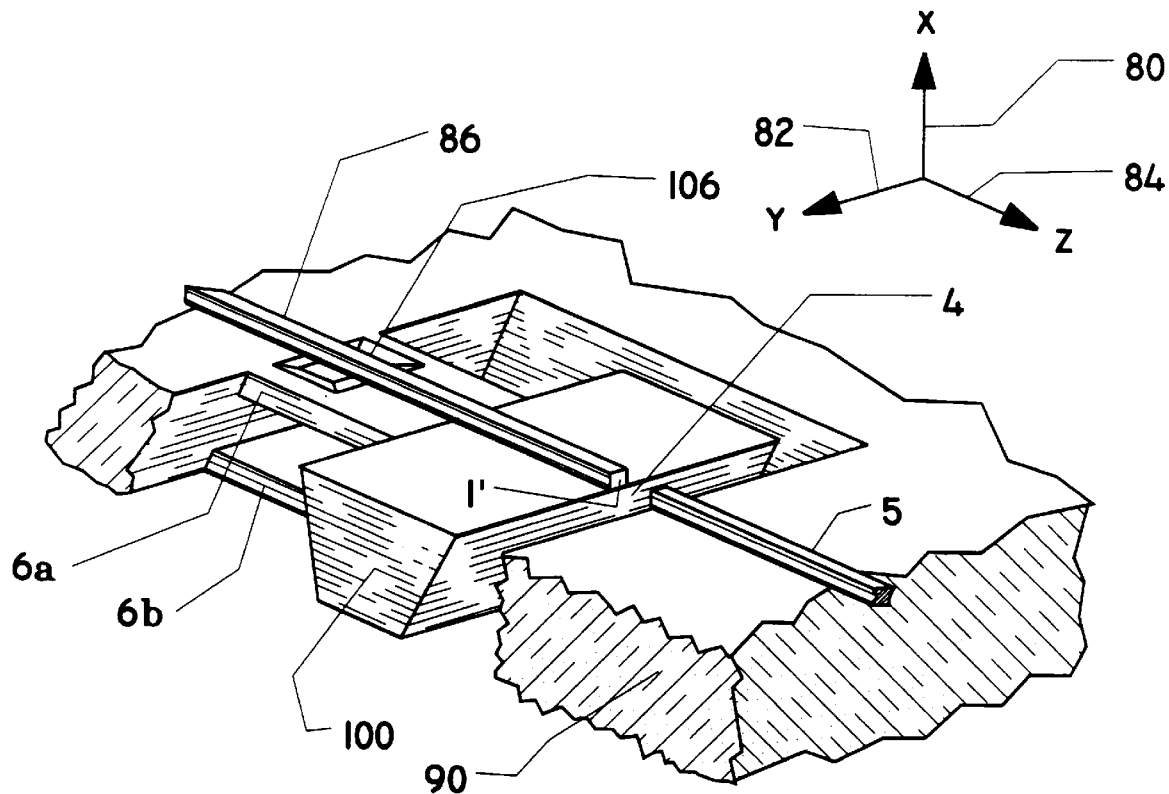
FIGS. 17A and B is a schematic diagram of a two-prong silicon cantilever having a resonant micro-bridge incorporated in the ridge waveguide. A: perspective, B: cross-section.
Figure 17B:
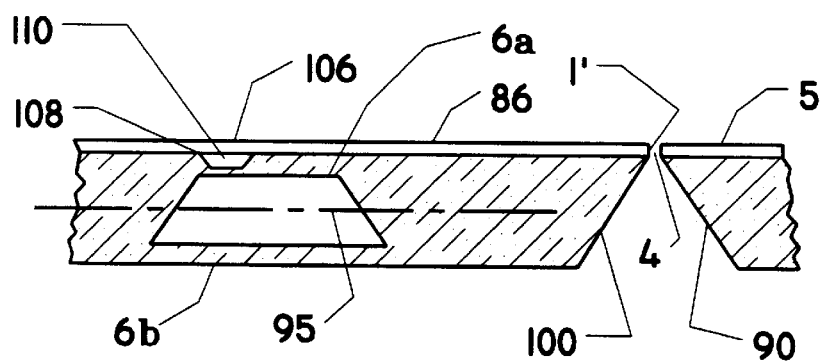

Resonance can be measured optically by incorporating the resonant element in the ridge waveguide at a location where it is most affected by displacement of the cantilever. A section of the ridge waveguide 86 is suspended over pit 110 which is etched anisotropically in silicon cantilever 6 near the point 108 which undergoes maximum bending strain, as shown in FIG. 17. The suspended bridge 106 has a length up to a few hundred microns and a resonant frequency up to 1 MHz. The micro-bridge is excited at its resonance either optically by shining intensity modulated light externally onto the bridge, or electrodynamically, by depositing a polysilicon or metal electrode over the bridge. The micro-bridge behaves like a tensioned string, its resonant frequency changes linearly with the bending of the cantilever. For this reason, additional circuitry is needed to track the resonant frequency and to excite the bridge always at its resonance. The use of the bridge in this mode is advantageous because the bending stresses due to lateral forces are much higher than axial stresses which would occur if the same forces were acting along the axis of the cantilever.

Figure 18A:
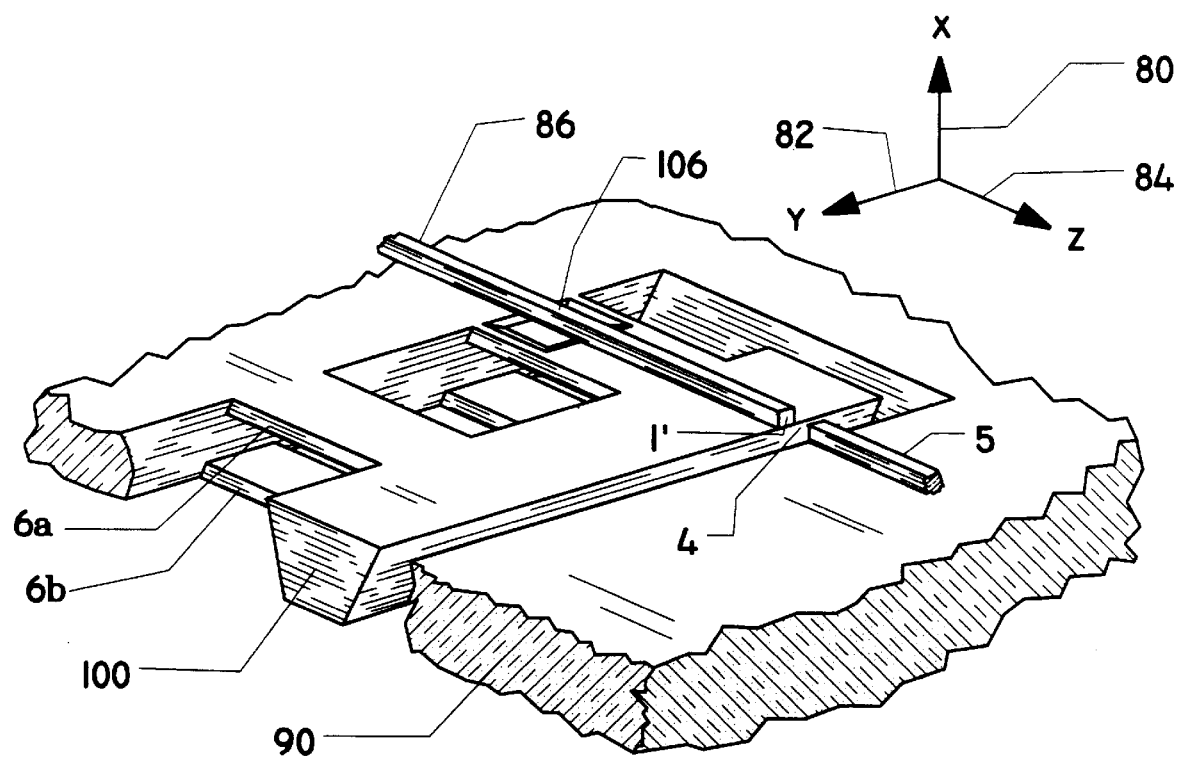
FIGS. 18A and B is a schematic diagram of a four-prong silicon cantilever with a resonant micro-bridge distanced laterally from the neutral axis. A: perspective, B: bottom view.
Figure 18B:
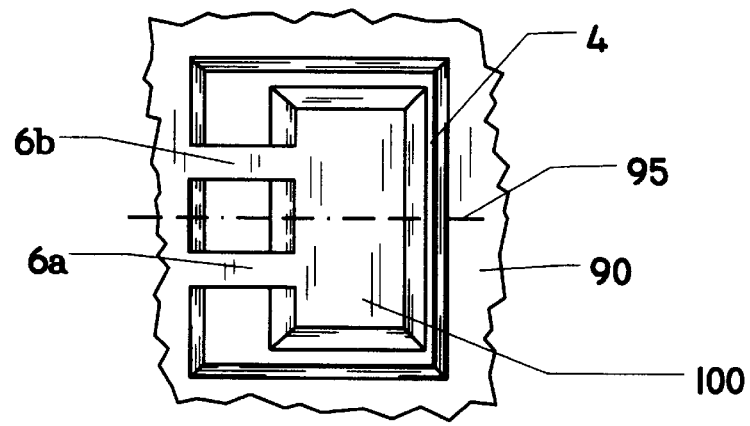

The micro-bridge 106 should be located as far as possible from the neutral axis 95. This can be achieved with the designs elaborated previously in conjunction with the path length producing mechanisms in the gap. A silicon cantilever with two prongs 6a and 6b is used to distance the neutral axis 95 from the bridge 106 vertically, as shown in FIG. 17. This causes the resonant frequency of microbridge 106 to be affected by out-of-plane x- 80 displacements of cantilever 6. Similarly, the micro-bridge can be made susceptible to in-plane y- 82 displacements by distancing it horizontally from the neutral surface with the use of a four-prong cantilever, as shown in FIG. 18.

Vibration of the micro-bridge modulates the phase of the light by stretching the waveguide and modifying its index of refraction. So does the cantilever, except that phase modulation due to cantilever displacement occurs at a much lower speed and takes place in the gap outside the waveguide. The low speed phase is detected with the phase detection circuitry 56, 64 and 66. This locks the low speed phase in the interferometer at the middle of a linear portion of a fringe. Since the resonant frequency of the micro-bridge is beyond the bandwidth of the servo circuitry it cannot be compensated for with the servo. Therefore, high speed phase modulation appears as a ripple at the output of the detector 12. The ripple is at the resonant frequency because high speed phase modulation is only a fraction of a fringe and remains within the linear range of the fringe. We wish to measure the frequency of this ripple rather than its amplitude. This can be done with the use of an electronic counter whose output is readily digitizable. Change in frequency output is linearly related to displacement of the cantilever. This differentiates this technique from others which measure the phase change resulting from stretching the waveguide or fiber in that the phase change due to the vibration of the micro-bridge is not actually measured, rather, the change in its resonant frequency optically.

This invention discloses how an optical phase change can be produced in the gap between two waveguides or in a micro-bridge incorporated in the waveguide for the purpose of measuring the displacement of a cantilever carrying the waveguide. Reciprocally, displacement of a cantilever or a micro-bridge can be prescribed for the purpose of producing phase modulation in an optical path.

Interferometers operate in a phase-locked closed loop configuration to produce a voltage output proportional to the phase. This requires use of servo feedback 56 as well as modulation 64 and demodulation 66 as explained before. The feedback signal 61 and the modulation signal 65 can be applied either to the phase modulator 62 as shown in FIG. 7, or to a laser 11 directly as shown in FIG. 8, depending on which feedback scheme is used. Fiber-optic and integrated-optic phase modulators currently available operate either piezo-electrically by straining the fiber or electro-optically by changing the index of diffused waveguides or acousto-optically by inducing a traveling wave index perturbation in a thin film. These techniques require the use of materials which exhibit a large electro-optic or photo-elastic effect such as $LiNbO_3$ or Quartz. Silicon is a passive material which is neither electro-optically nor acousto-optically active. It is the material of choice for integrated-optic sensors because of ease of micromachining and compatibility with microelectronic processing. Phase modulation cannot be done efficiently electrically in silicon and requires use of an external substrate. For this reason, phase modulation in the integrated optic arm 2 of an interferometer 3 necessitates use of fiber-optic connections between substrates which increases the cost of the sensor substantially. Laser feedback and modulation is more advantageous because it eliminates the need for an external phase modulator and yields compact sensors, especially with the use of laser diodes. However, there are situations where laser feedback is not possible such as in an equal-arm interferometer. The path length difference in an interferometer is set very close to zero in high accuracy applications in order to cancel the effect of laser frequency noise. This is easily achievable with integrated-optics down to submicron accuracy with the use of proper masking technology. The use of external fiber-optic connections would undermine the precise control over the optical path length difference in high accuracy applications. For this reason, there is a need to effect phase modulation monolithically in the passive substrate carrying the sensor or interferometer. This is not currently available.

Either the cantilever or suspended micro-bridge can effect the required phase modulation mechanically and monolithically. Here the bridge is not carried by the cantilever and they do not operate jointly. Neither is a sensor, their sole function is to provide the phase modulation. They are driven either optically or electrodynamically at the desired frequency. When used in conjunction with phase-locked interferometers the feedback signal 61 and the modulation signal 65 are applied directly to either the bridge 106 or the cantilever 6. In this application signal 65 must have a much higher frequency than that of signal 61 and should have an amplitude of $\pi/2$ for most efficient phase modulation. The cantilever or micro-bridge can be driven on or off resonance in order to tune the amplitude of the modulation. They can be used in phase-locked interferometers and for phase modulation in general. This provides the most rugged compact and economic monolithic means for modulating the phase of a light beam.

This invention presents extrinsic interferometric sensors which are compact, miniaturizable and readily transferable to the solid state domain. This provides clear performance and economic advantages. These sensors can be used very effectively for the measurement of acceleration, acoustic signals, and in the scanning atomic force microscope, among others. Even though the embodiments are presented in the context of fiber-optic or integrated-optic waveguides the principles apply to any optical path in general capable of producing the same effect, whether the light is guided or not. Any convenient materials, substrates and substances from which the guiding and non-guiding media can be made can be substituted for those given by means of example. Such sensors use either refraction or diffraction at the interface between a waveguide and a non-guiding medium in conjunction with the displacement of a cantilever beam. The waveguide and cantilever are integrated in a monolithic substrate along with other parts of an optical circuit. The disclosure also illustrates use of a resonant element to improve the detection technique. Also, monolithic means are provided to modulate the phase of the light mechanically in an integrated-optical setting. This can be used in numerous optical applications where phase modulation is necessary or advantageous.

The invention has been described in terms of the preferred embodiments. The described embodiments should not be construed as a limitation on the scope of the invention. Modifications and ramifications may be made without departing from the spirit and scope of the invention. Thus, it is intended by the following claims to cover all such modifications and ramifications.

What is claimed is:

1. A method of manufacture of an optical sensor having an optical path comprising the steps of:

providing a substrate with a coating;

removing excess coating and substrate to form a cantilever;

providing an optical waveguide on said cantilever to form a cantilevered waveguide; and providing said cantilevered waveguide with an end face, said end face consisting of a singular substantially planar face, said end face making an acute angle with the axis of said cantilevered waveguide at said end face, wherein said acute angle provides a dimensional change in the length of said optical path proportional to a displacement of said cantilever.

2. The method of claim 1 wherein said substrate is chosen from the group consisting of silicon and gallium-arsenide and said coating is silica.

3. The method of claim 1 further including the step of masking said coating and said substrate prior to the step of removing.

4. The method of claim 1 wherein said cantilever has at least two prongs.

5. The method of claim 1 wherein said coating is a silated resist and said method further includes the step of converting said silated resist to silica.

6. The method of claim 1 wherein an axis of said waveguide is substantially non-coincident with a neutral axis of said cantilever.

7. The method of claim 1 further including the step of providing at least one of said substrate and said cantilever with electrodes.

8. The method of claim 1 wherein said dimensional change in length is proportional to a displacement of said cantilever.

9. The method of claim 1 wherein said optical sensor is interferometric.

10. A method of manufacture of an optical sensor having an optical path comprising the steps of:

providing a substrate having a first surface;

coating said first surface;

removing excess coating and substrate to form a cantilever; and forming an optical waveguide on said cantilever, said optical waveguide having an end face;

said end face consisting of a singular substantially planar face, said end face making an acute angle greater than 0.01 radian with the axis of said optical waveguide at said end face;

wherein said acute angle provides a dimensional change in the length of said optical path proportional to a displacement of said cantilever.

11. The method of claim 10 wherein said acute angle is in a plane parallel to said first surface.

12. The method of claim 10 wherein said acute angle is in a plane perpendicular to said first surface.

13. The method of claim 10 wherein said substrate further includes a second surface and wherein both said first surface and said second surface are flattened and smoothened.

14. The method of claim 10 wherein said cantilever is substantially more compliant in a direction parallel to said first surface than perpendicular to said first surface.

15. The method of claim 10 wherein said cantilever is substantially more compliant in a direction perpendicular to said first surface than parallel to said first surface.

16. The method of claim 13 wherein said coating covers both said first surface and said second surface.

17. A method of changing the length of an optical path in a less guiding medium comprising the steps of:

providing said optical path with a cantilevered guiding medium having an axis adjacent to said less-guiding medium;

terminating said guiding medium at a point on said cantilever;

providing a displacement of said point on said cantilever having a substantial component along a direction of said optical path.

18. The method of claim 17 wherein said point is substantially distant from a neutral axis of said cantilever.

19. The method of claim 17 further including the step of inclining the axis of said guiding medium relative to a neutral axis of said cantilever by a substantial angle.

20. The method of claim 18 further including the step of distancing said point from said neutral axis parallel to a surface of said substrate.

21. The method of claim 18 further including the step of distancing said point from said neutral axis perpendicular to a surface of said substrate.

22. The method of claim 21 wherein distancing of said point from said neutral axis perpendicular to said surface of said substrate is achieved with the use of at least two prongs.

23. A method of manufacture of an optical sensor having an optical path comprising the steps of:

providing a substrate having a surface;

coating said surface;

removing excess coating and substrate to form a cantilever;

forming an optical waveguide on said cantilever having an end face;

providing said end face with a diffraction grating;

wherein a dimensional change in the length of said optical path proportional to a displacement of said cantilever is produced.

24. The method of claim 23 wherein said diffraction grating is parallel to said surface.

25. The method of claim 23 wherein said diffraction grating is perpendicular to said surface.

* * * * *